Jan. 9, 1951 R. J. WISE ET AL 2,537,199

FACSIMILE SWITCHING SYSTEM

Filed May 18, 1948 9 Sheets-Sheet 1

INVENTORS
R. J. WISE
M. J. REYNOLDS
BY M. J. Reynolds
ATTORNEY

Jan. 9, 1951 R. J. WISE ET AL 2,537,199

FACSIMILE SWITCHING SYSTEM

Filed May 18, 1948 9 Sheets-Sheet 2

INVENTORS
R. J. WISE
M. J. REYNOLDS

BY

M. J. Reynolds
ATTORNEY

INVENTORS
R. J. WISE
M. J. REYNOLDS

BY M. J. Reynolds
ATTORNEY

Jan. 9, 1951 R. J. WISE ET AL 2,537,199

FACSIMILE SWITCHING SYSTEM

Filed May 18, 1948 9 Sheets-Sheet 4

INVENTORS
R. J. WISE
M. J. REYNOLDS
BY M J Reynolds
ATTORNEY

INVENTORS
R. J. WISE
M. J. REYNOLDS

BY

M. J. Reynolds

ATTORNEY

INVENTORS
R. J. WISE
M. J. REYNOLDS
BY
M J Reynolds
ATTORNEY

Jan. 9, 1951 R. J. WISE ET AL 2,537,199

FACSIMILE SWITCHING SYSTEM

Filed May 18, 1948 9 Sheets-Sheet 7

INVENTORS
R. J. WISE
M. J. REYNOLDS
BY M. J. Reynolds
ATTORNEY

INVENTORS
R. J. WISE
M. J. REYNOLDS
BY
M. J. Reynolds
ATTORNEY

INVENTORS
R. J. WISE
M. J. REYNOLDS
BY
M J Reynolds
ATTORNEY

Patented Jan. 9, 1951

2,537,199

UNITED STATES PATENT OFFICE 2,537,199

FACSIMILE SWITCHING SYSTEM

Raleigh J. Wise, Arlington, and Marvin J. Reynolds, Montclair, N. J., assignors to The Western Union Telegraph Company, New York, N. Y., a corporation of New York Application May 18, 1948, Serial No. 27,728

30 Claims. (Cl. 178—6.6)

This invention relates to a facsimile switching system and more particularly to such a system arranged to be operated in accordance with switching code signals accompanying or forming a part of the facsimile transmission.

One of the objects of this invention is to provide a coded message blank to which the switching code may be conveniently applied and from which the code signals may be transmitted by usual facsimile scanning means.

Another object is to provide suitable switching code detecting means responsive to the transmitted signals for determining the required switching operation.

Still another object is to provide means for transmitting the switching signals from the message sheet and for subsequently and automatically transmitting the message, picture or other facsimile subject matter under the control of the switching operation.

A still further object is to provide means for translating facsimile signals into telegraph code selecting impulses.

A further object is to provide a facsimile switching system having means for automatically numbering switched messages.

Still another object is to provide suitable storage mechanism for received facsimile messages.

Another object is to provide a facsimile switching system embodying intermediate storage and retransmission of facsimile subject matter.

Many other objects and advantages will appear as the description proceeds.

In accordance with our invention we provide a facsimile message blank having a predetermined zone thereon in which a code address may be readily inserted for transmission ahead of the body of the message by the usual facsimile scanning means. This code address initiates a call to the central switching office and operates suitable code detecting apparatus for visually indicating to the switchboard operator, the code designation of the station of destination of the message awaiting transmission.

At the switching office the operator may manually switch the incoming call to the desired local recorder, to an outgoing circuit or to local storage means for subsequent retransmission.

The facsimile transmitter is so controlled that only the coded switching information is initially transmitted under the control of the transmitting operator. This is effected by transverse scanning of the coded zone of the blank without longitudinal scanning of the message. The longitudinal scanning is under the control of the switching office and is initiated by control signals transmitted from the switching office automatically upon the completion of the switching connection.

In the embodiments described hereinafter the switching is completed manually through jack and plug connections but is susceptible to operation by means of full automatic switching equipment.

In the case of a local message or a message designated for the central office, the calling circuit is switched directly to a local recorder and, if destined for a remote station, the incoming circuit is switched to a trunk circuit which terminates in a recorder. In case such local recorders or trunk circuits are busy, the incoming lines may be switched to an appropriate storage device for later transmission. As soon as a switching connection is made, the control of the calling transmitter is transferred to the called recorder or storage device which operates upon completion of the transmission of a message to send a control signal to the station of origin of the message to stop the transmitter and in addition to signal the operator at the switchboard position of the completion of the transmission so that she may unplug the connection.

When a switching connection is made to a trunk circuit, either directly from the calling line or from a storage device, consecutive numbers in the form of facsimile signals are automatically inserted ahead of or interspersed with the message signals to provide the required lost message checking information at the recording station. One such numbering machine is provided for each outgoing trunk.

The invention will be more fully understood by reference to the accompanying drawings, in which.

Figures 1, 2, 3:
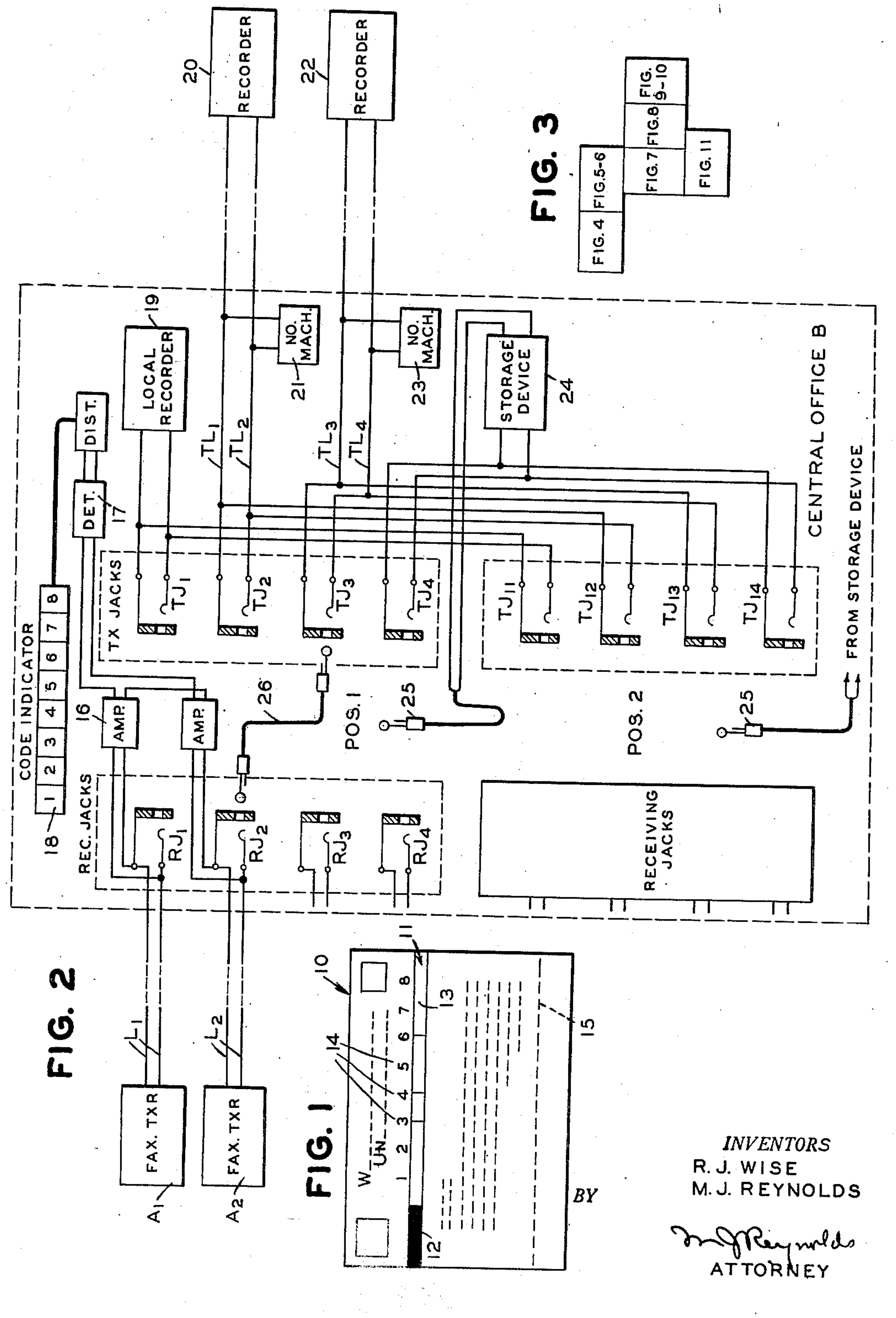
Fig. 1 illustrates a form of coded message blank usable in carrying out the present invention.
Fig. 2 is a schematic diagram showing one form of general circuit layout utilizing the invention.
Fig. 3 shows the arrangements of the Sheets 2–7 of the drawings to form a composite circuit.

Referring first to Fig. 1, the transmitting message blank 10 there shown is of the usual telegraph blank form with the addition thereto of a zone 11 in which the switching address of the message may be indicated. This zone comprises a continuous dark portion 12, and a continuous light portion 13, the latter having a series of eight equally spaced index points 14, disposed therealong. In use it is contemplated that each office of destination associated with the switching system will have an individual code number of one or more digits formed by the digits 1 to 8 in ascending sequential order, as 134. The subscriber or sub-station operator on determining the number of the office of destination of a message places marks or lines transversely across the code zone opposite the appropriate indexes. The blank of Fig. 1 has been so marked for the code address 346.

Adjacent the bottom of the message blank is a series of dashes 15 equally spaced and of such length as to generate an alternating current of definite frequency when scanned by the transmitting scanning apparatus, as for instance, 70 cycles. This serves as an end-of-message signal.

The body or text of the message is written or typed in the space between the code zone 11 and the end-of-message markings 15.

Referring now to Fig. 2, the system shown for using the coded message blank 10 comprises a number of subscriber's offices or sub-stations, $A_1$, $A_2$, etc., each including a facsimile transmitter of suitable type for operation over an individual circuit comprising a pair of conductors $L_1$, $L_2$, terminating at a central office B in the receiving jacks $RJ_1$, $RJ_2$, etc. Associated with the line side of each receiving jack is an individual amplifier 16, the output side of which is connected to a common detector 17 for converting the code signals transmitted from the blank 10 into D. C. signals for the operation of a code detector and visual indicator 18 from which the central office operator may determine the destination of the incoming message and make the appropriate switching connection.

Transmitting jacks are also arranged at the switchboard, multipled to a plurality of positions, indicated generally in Fig. 2 as Pos. 1 and Pos. 2 and specifically as TJ1, TJ2, TJ3, TJ4, etc. (Pos. 1) and TJ11 to TJ14, etc. (Pos. 2). In the particular embodiment shown the jacks TJ1 and TJ11 represent local receiving positions and are connected to a common local facsimile recorder 19 at the central office. Jacks TJ2 and TJ2 represent a remote facsimile recorder 20 at a distant office. A message numbering machine 21 is arranged to be connected into the circuit at the start of each transmission over the lines TL1, TL2 for the purpose of applying consecutive number signals to each message transmitted thereover. Jacks TJ3 and TJ13 are similarly connected to a second trunk circuit TL3, TL4, having a numbering machine 23 associated therewith and terminating in a facsimile recorder 22. Jacks TJ4 and TJ14 are shown connected to the receiving side of a suitable facsimile signal storage device 24 of the magnetic tape recording type, the transmitting side of which is provided with a plug 25 and associated cord circuit whereby messages stored therein may be subsequently switched to the appropriate destination. Connections between the incoming jacks RJ and outgoing jacks TJ are made by patching cords 26.

It will be understood, of course, that any desired number of receiving and transmitting positions may be provided and that the number of local jacks, trunk jacks and storage jacks, and their associated equipment which may be provided, is limited only by the limitations of the switching code. The eight-unit code shown provides a maximum of 256 selections. It is to be further understood, however, that the eight-unit code is shown only by way of example and if desired any other desired number of code impulses may be employed. Since, as will appear hereinafter, these code pulses are transmitted as a modulated carrier, the pulsing frequency is not limited to usual D. C. line signaling frequencies, the limiting factor being the ability of the code detecting relays, to be described, to receive the signals. The code may, therefore, be expanded to permit thousands of selections if desired. However, if the code is expanded beyond nine units, it is preferable to employ alphabetical code designations.

*Sub-station transmitter*

Figure 4:
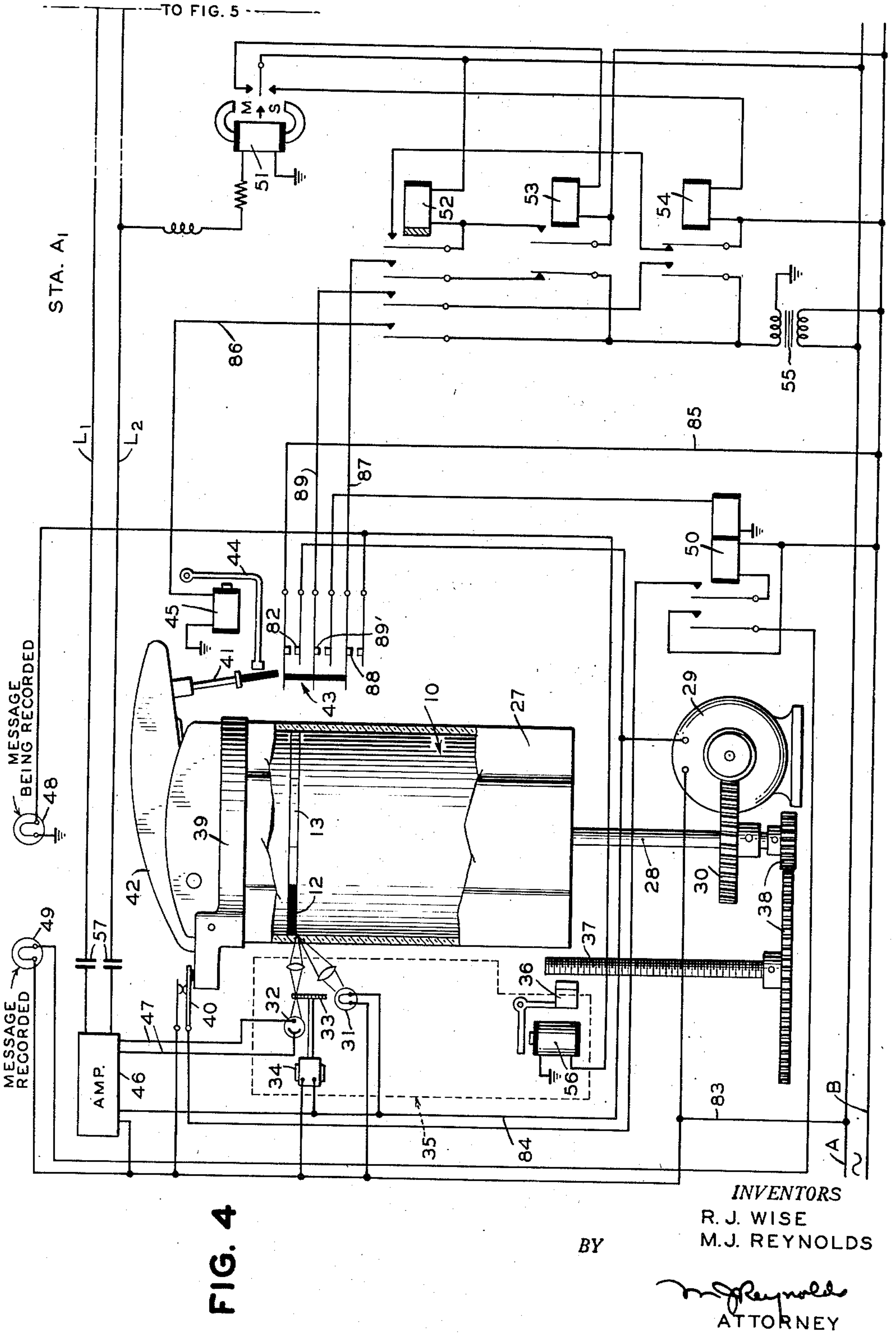
Fig. 4 is a circuit diagram showing the facsimile transmitting equipment at a subscriber's office or sub-station.

In describing the detailed circuit arrangements and associated equipment, the subscriber's or sub-station facsimile transmitting equipment shown in Fig. 4 will be considered first. It is to be understood that this may comprise any suitable type of facsimile transmitter adapted to be controlled over the outgoing circuit, from the remote end, such as the slot machine type of transmitter shown in Patent 2,262,715 to Wise et al., or a vertical type of transmitter, such as shown in Wise et al. application Serial No. 454,768, filed August 14, 1942, now Patent No. 2,469,423. For the purpose of illustration we have selected the latter type of transmitter. Briefly, this transmitter, Fig. 4, comprises a vertical transparent cylinder 27 mounted for rotation through a shaft 28 driven by a motor 29 through associated gearing 30. The cylinder 27 is adapted to hold, on the inside thereof, the rolled transmitting message sheet 10 and to scan the same through the wall of the transparent cylinder by an optical system comprising a light source 31, a photocell 32, and an interposed toothed chopper disc 33 driven by a motor 34. This equipment together with appropriate lenses is mounted on a carriage indicated by the dotted rectangle 35, which is movable down the face of the cylinder against a return spring (not shown) upon the engagement of a half nut 36 with a worm 37 driven by the shaft 28 through the gears 38, all as is fully described in the aforesaid application. The cylinder 27 is provided at the upper side with a hinged cover 39 capable of being opened to permit the insertion and removal of transmitting message sheets. In its closed position the cover 39 causes the engagement of a pair of contacts 40, these contacts being arranged to open with the opening of the cover 39. Pivoted upon the cover 39 is a latch member 41 adapted, when depressed by the finger lever 42, to close a contact bank indicated generally at 43, and to be latched in such depressed position by a forked lever 44 operated by a locking magnet 45. In addition to the apparatus described above, the equipment at each station, such as $A_1$, includes an amplifier 46 connected to the output of the photocell 32 by the conductors 47, two signal lamps 48 and 49 for indicating, respectively, when a message is being recorded at the station of destination, and when the recording of the message has been completed. A relay 50 is also provided at each station, as $A_1$, for controlling the operation of the "Message Recorded" lamp 49.

The relay control equipment at each station comprises a polar relay 51 adapted to control through its marking and spacing contacts a set of three control relays 52, 53 and 54, the functions of which will appear in the detailed description of the operation. A power transformer 55 is also provided at the transmitting station for supplying the energy for operating the locking magnet 45, the half nut magnet 56, and the relay 50. A pair of blocking condensers 57 are interposed between the amplifier 46 and the outgoing lines L1, L2.

Figures 5, 6:
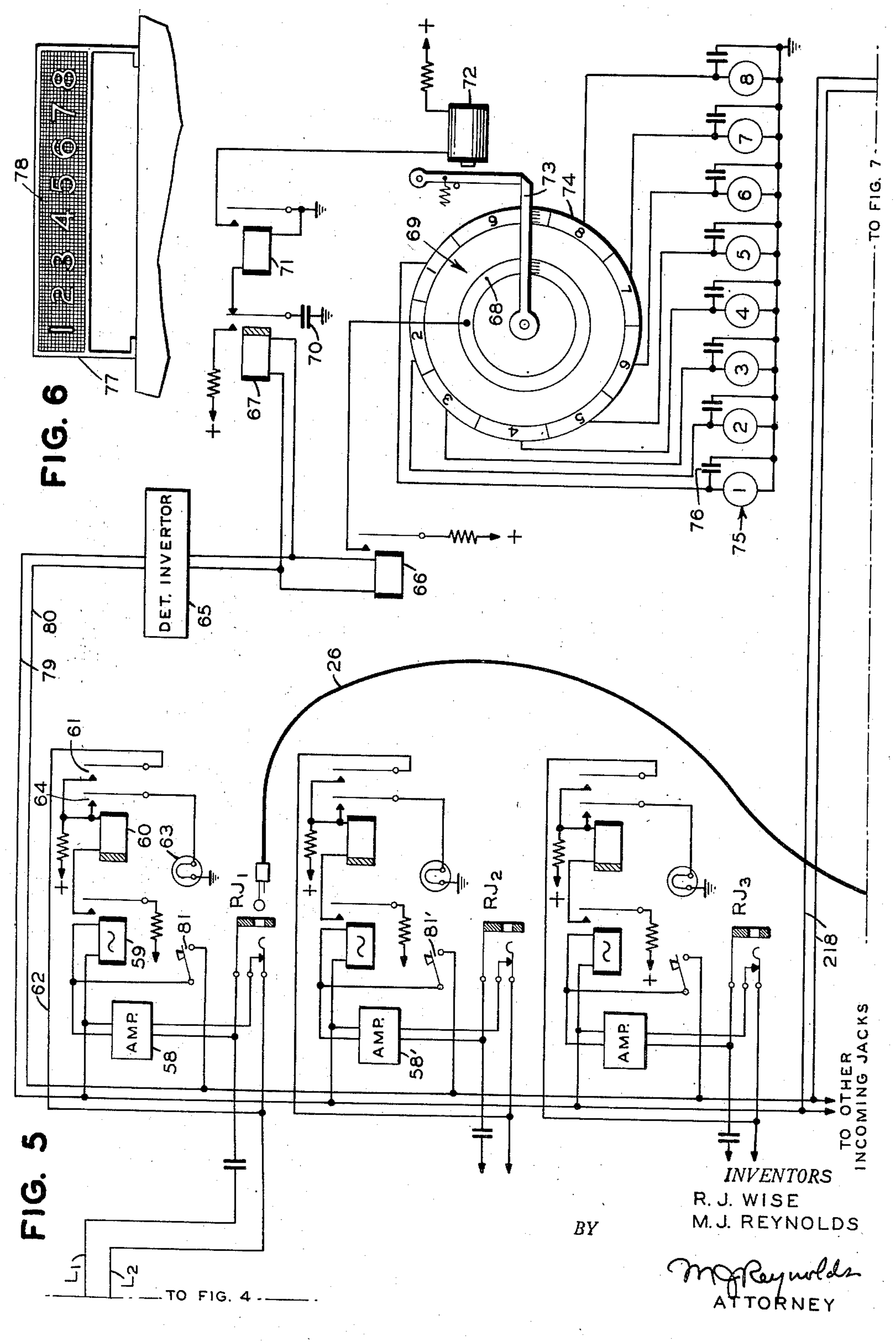
Fig. 5 shows the jack switching arrangement at a central station for extending calls from the transmitter of Fig. 4 to any desired destination, and including the switching code detecting means associated with incoming circuits.
Fig. 6 is a front view of the code indicating panel arranged above the switchboard position.

At the central switching office (Fig. 5) the lines L1, L2 terminate in the jack RJ1 across the line side of which is bridged an amplifier 58, the output side of which controls an A. C. relay 59. The contacts of relay 59 serve to operate a slow-to-release relay 60 which in turn serves to apply positive battery to the line L1, through contacts 61 and conductor 62, and to operate a signal lamp 63 through contacts 64.

*Code detector*

All of the equipment described in the above paragraph is individual to each jack $RJ_1$, $RJ_2$, etc. Also at each switchboard position at which incoming lines terminate and outgoing lines originate, and common to all incoming circuits at this position, is a code detector for reading the code address transmitted from the message blank and for indicating to the switchboard operator the desired destination of each incoming message. This code responsive device comprises a vacuum tube detector-inverter 65 for converting the incoming code modulated carrier signals into D. C. impulses. The output of the detector is connected in parallel to two relays 66 and 67. The make contact of relay 66 is connected to the solid ring 68 of a start-stop distributor 69 of conventional form, and the armature of relay 66 is connected to battery. The armature of relay 67 is connected to a grounded condenser 70 arranged to be charged through its front contact and to be discharged through its back contact and the winding of a relay 71 to ground. This latter relay serves, when momentarily operated from the condenser 70, to operate the distributor start magnet 72 and thereby release the distributor brush arm 73 for a single revolution. The segmented ring 74 of the distributor is divided into nine segments numbered 1–9, corresponding to the eight indexed positions of the code zone 13 of the message blank and the solid dark portion 12, respectively. Each of the segments 1–8 is connected to one terminal respectively of a bank 75 of eight discharge lamps, the opposite electrodes of which are grounded. A storage condenser 76 bridged about each lamp serves to prolong the discharge therethrough. The lamps 75 may be suitably arranged in individual compartments in the rear of an opaque frame 77 (Fig. 6) carrying transparent numerals 78, as is well understood in the art. The frame 77 may be located above the switchboard position where it is readily observable by the switchboard operator.

The brush arm of the distributor 69 is driven by any suitable motor at the same speed as the transmitting cylinder 27 and is phased by the incoming signals, as will later appear, so as to cause the segments 1–8 to be connected to battery at the contact of relay 66 in phase with each corresponding incoming code signal.

The input side of the detector-inverter 65 is connected through one conductor 79 in multiple to one side of the output of each of the receiving amplifiers 58, 58′, etc. The other output conductor 80 of the detector-inverter is multipled to the opposite side of each of the amplifiers 58, 58′, etc. through individual, normally open push button switches 81, 81′, etc., associated with each receiving jack.

Before proceeding with the description of the remainder of the system, the operation of the facsimile transmitter and code detector will be described.

Let it be assumed that the transmitter at station $A_1$ is idle and that there is no plug in the receiving jack RJ1 at the central station. Under such conditions there will be no potential applied to the lines L1, L2, and the polar relay 51 (Fig. 4) will be in its mid-position and the relays 52, 53 and 54 will all be deenergized. Also, at station $A_1$ there will be no energy in any parts of the circuit. If now an operator at station $A_1$ desires to transmit a facsimile message to a remote station of the system, she marks the code address on the message, by making vertical marks opposite the appropriate indexes, opens the cover 39 of the transmitting cylinder, and places therein the desired message for transmission. The coded zone is so arranged as to be located opposite the uppermost or starting position of the scanning carriage 35 so that when the transmitter is started, the coded address will be immediately transmitted to the line. On the closing of the cover the contacts 40 close but the circuit therethrough is open at the back contact of relay 50. The operator depresses the hand lever 42, moving the switch 43 to engage all of its lower contacts. This switch at contacts 82 completes a circuit from terminal A of the A. C. power source through the conductor 83, thence in parallel through the cylinder motor 29, exciting lamp 31, chopper motor 34, and the power supply for the amplifier 46, to the conductor 84, and thence by the contacts 82 and conductor 85 to the opposite side B of the power supply. The motor 29 starts the rotation of the cylinder 27 but the scanning carriage 35 remains stationary since the half nut 36 is disengaged from the worm 37. The light from the lamp 31 is reflected from the cylinder 27 through the chopper disc 33 and received by the photocell 32, amplified by the amplifier 46 and applied to the lines $L_1$, $L_2$. It comprises a steady tone interrupted by the solid dark area 12 and the code markings on the blank. At the central station this code modulated tone is received by the amplifier 58 and causes the operation of relay 59. This relay follows the code interruptions but the relay 60 operated thereby is sufficiently slow so that it remains operated continuously to thereby operate the signal lamp 63 thru contacts 64 and apply positive battery to the line $L_2$ through its contacts 61 and conductor 62. This positive current applied to line $L_2$ operates the polar relay 51 (Fig. 4) to its marking contact M, thereby completing a circuit from the A terminal of the power source through the tongue of relay 51, the marking contact M and the winding of relay 53 to the opposite side of the power supply. The relay 53, through its inner armature and front contact, completes a circuit through the winding of relay 52 from the power source, and the relay 52 at its outermost armature closes a circuit from the secondary of the transformer 55 and the conductor 86 to the locking magnet 45, which operates the locking lever 44 to lock the hand lever 42 depressed, thereby retaining the switch 43 in its lowermost position. Up to this time, ordinarily less than a second, it is necessary for the operator to hold the lever 42 depressed.

It will be recalled that when the relay 60 at the central station operated to apply positive battery to the line $L_2$, that the signal lamp 63 operated to advise the receiving operator of the incoming call. Upon observing this signal, the operator closes the associated switch 81, thereby connecting the output of the amplifier 58 to the detector 65, which also serves to invert the D. C. signals. Various forms of detector-inverters are well known in the art and, therefore, it is unnecessary to describe such device in detail. Therefore, relay 66 will be operated whenever the code marks on the message are scanned. Relay 67 is slightly slow to operate, however, and does not respond to the code marks but only to the prolonged pulse from the phasing area 12 of the blank. Therefore, during scanning of this area the condenser 70 is connected to charging battery. As the scanning passes from zone 12 to zone 11 of the blank, however, relay 67 releases and causes the condenser to discharge through the winding of relay 71 of the distributor 69 which operates momentarily to energize the start magnet 72 and release the brush arm 73 in phase with the coded area of the transmitting blank, resulting in the operation of the selected lamps in the bank 75. These lamps are energized once for every revolution of the transmitting cylinder, causing the selected lamps either to flicker or glow continuously depending on the capacity of the storage condensers 76. Ordinarily the condensers 76 will be sufficiently large to hold the lamps energized for a full revolution, so that they glow steadily as long as the switch 81 is depressed.

The operator noting the called number may then make the appropriate switching operation. She may take one of three courses: (1) patch the incoming call to an idle channel through the called station jack; (2) direct it to a storage medium; or (3) release the push button 81 and permit the transmitter to idle until the switching operation may be completed. It will be remembered that the half nut 36 at the transmitter has not yet been engaged so that the scanning carriage remains stationary during this period.

Figure 7:
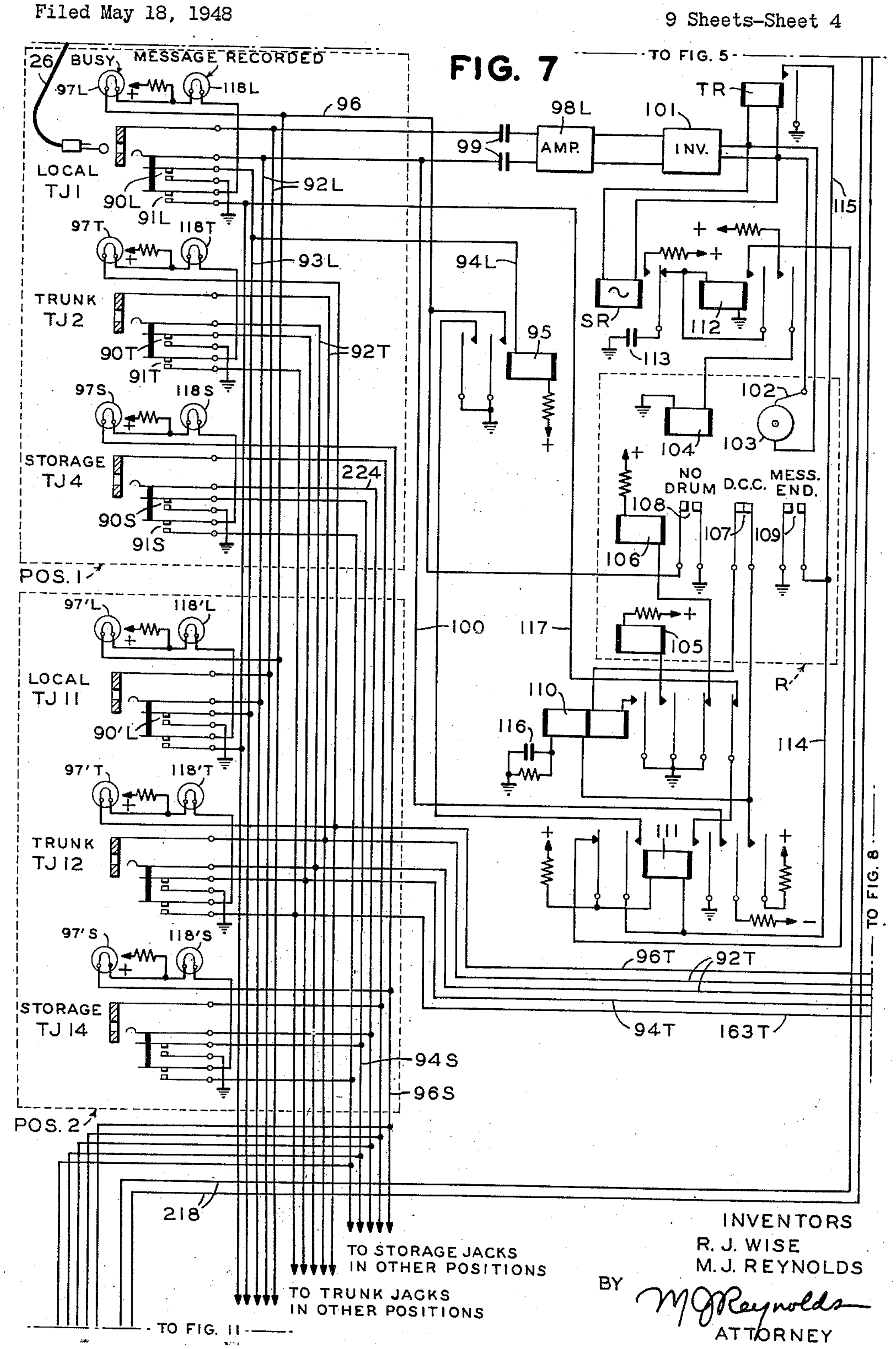
Fig. 7 is a circuit diagram of the facsimile recording equipment at a local receiving position at the switching office.

Let it be assumed that the code address indicated a local receiver at the central station as the point of destination of the message and further that there is an idle central office recorder available. The operator then will insert one terminal of the patching cord 26 into the idle local transmitting jack, as TJ1 (Fig. 7). This immediately busies the associated recorder at all of the corresponding jacks TJ11, etc. at each switchboard position, as will hereinafter appear. The operator then inserts the opposite end of the patching cord in the receiving jack, as RJ1, of the calling transmitter. This latter operation lifts the amplifier 58 from the lines $L_1$, $L_2$ causing relay 60 to release, extinguishing the call lamp 63 and removing positive battery from line $L_2$. This causes the polar relay 51 at the transmitter to return to its mid-position thereby interrupting the operating circuit for the relay 53. Relay 52 remains locked up, however, through its inner front contact. The release of relay 53 completes a circuit from the secondary of the transformer 55, the left hand tongue and back contact of relay 53, the second tongue and associated contact of relay 52, conductor 87 and the lower contacts 88 of the contact bank 43 to the winding of the half nut magnet 56, whereupon the half nut 36 is engaged with the driving worm 37, causing a scanning operation of the scanning carriage 35 to commence. As the carriage 35 moves downwardly, the coded zone 11 is first scanned, followed by the body of the message, and finally by the end-of-message signal from the markings 15.

Means is provided at the recorder, as will subsequently appear, for transmitting a signal over conductor L2 to stop the transmitter at the end of a message. This means may in turn be controlled by the end-of-message signal 15 or it may be actuated by a predetermined operation of the recorder itself, as will later be described. The control signal consists of the application of a negative potential to line L2 causing the polar relay 51 to move to its spacing contact S. This movement completes an operating circuit for the relay 54 from the power supply A, B. The operation of relay 54 interrupts the locking circuit of relay 52 but the operating characteristics of relays 52 and 54 are such that relay 54 is operated for a short interval before the release of relay 52 and during this interval a circuit is completed from the secondary of the transformer 55, through the left armature of relay 54, the third armature of relay 52, conductor 89, and contact 89' of the contact bank 43 to the operating winding of the relay 50. This relay operates and locks up to the power supply A, B through its left hand winding, and the closed cover contacts 40. The operation of relay 50 also completes a circuit from the power line B, the left contact and armature of relay 50 and "Message Recorded" lamp 49 to the opposite side of the power source. Lamp 49 thereby signals to the transmitting operator that the transmission has been completed. Immediately after the operation of relay 50, relay 52 releases thereby interrupting, at the left hand contact, the circuit for the locking magnet 45, whereupon the locking lever 44 releases the latch 41 permitting the switch 43 to return to its upper position.

The return of contact bank 43 to its upper position interrupts, at contact 82, the operating circuit for the motor 29, the lamp 31, the chopper motor 34 and the amplifier 46 from the power source A, B, thus restoring all the equipment at this station to normal with the exception of the "Message Recorded" lamp 49 which remains lighted. The operator may now raise the cover 39 to remove the recorded message sheet and in so doing opens the contacts 40, thereby opening the locking circuit to the relay 50 and consequently interrupting the circuit to the "Message Recorded" lamp 49. Station $A_1$ is now completely restored to its inoperative or normal condition.

*Transmitting position and local recorder*

It will be recalled that the transmitter at station $A_1$ was initiated by patching the receiving jack RJ1 to the local transmitting jack TJ1 at the central office. The transmitting jacks and the local recorder are shown in Fig. 7, which will now be referred to.

Each of the jacks TJ1, TJ2, etc. comprises, in addition to the ring and tip terminals, two sets of contacts 90 and 91 (designated 90L, 91L for the local jacks, 90T, 91T for the trunk jacks, and 90S, 91S for the storage jacks) adapted to be closed when the patching plug is inserted. The terminals of the local jack TJ1 at Position 1 of the switchboard are multipled by conductors 92L to the corresponding terminals of the corresponding jack TJ11 at Position 2, etc. One contact of the switch 90L at each jack is grounded and the opposite contact is multipled by conductor 93L to the corresponding contacts of each of the local jacks TJ1, TJ11, etc. and connected by a conductor 94L, through the winding of the busy relay 95 to battery. Relay 95 is thus operated whenever a plug is inserted in any one of the local jacks associated with the recorder of Fig. 7. The operation of relay 95 applies ground to the conductor 96 connected in multiple to one terminal of each of the local jack busy lamps 97L, 97'L, etc. at each position, the opposite terminals of which are connected to battery. As a consequence the local jack busy lamps operate in each position whenever a local jack is occupied in any position.

The second pair of contacts 91L of jack TJ1 prepares a circuit for the "Message Recorded" lamp at that jack only, this circuit being completed when the full message has been received, as will later appear.

With the jack TJ1 occupied by the patching cord the circuit from the incoming lines L1, L2 are extended through the normal jack contacts to the input of the amplifier 98L, appropriate blocking condensers 99 being included in the jack circuit to isolate the amplifier from the D. C. control signals applied to the line over conductor 100, as will subsequently appear. The amplifier output is connected to a signal inverter 101 having its output connected across the stylus 102 and drum 103 of the facsimile recorder. A relay TR tuned to the frequency of the end-of-message signal 15 transmitted from the blank 10 is connected across the inverter output. An A. C. starting relay SR, which responds to the carrier tone, is also connected across the output of the inverter. This relay is designed to be operated during the period of the long interruption caused by the phasing area 12 of the transmitting blank and to release at the end of this period.

The recording apparatus, indicated within the dotted rectangle R, is preferably of the form shown in Patent 2,255,868, granted September 16, 1941, to Wise et al. Briefly, this recorder comprises means for supporting the receiving cylinder 103 in a horizontal position for rotation through a friction clutch controlled by a stop arm through a phasing magnet adapted to be operated by a received signal to start the drum into rotation in phase with the transmitting drum. It further provides for the support of a plurality of spare message blank bearing drums with motor-driven apparatus for changing drums at the completion of each recording operation. The recording is effected electrically by the stylus 102 bearing on the drum, and the scanning is controlled by a half nut magnet, a control magnet being provided which when energized simultaneously raises the stylus from the cylinder and removes the half nut magnet from the driving worm.

In Fig. 7 the phasing magnet is indicated at 104, the drum changing magnet at 105 and the stylus and half nut magnet at 106. In addition to these elements the recorder is provided with three contacts 107, 108 and 109, contact 107 being associated with the drum changing mechanism to open momentarily near the end of the drum changing operation; contact 108 is arranged to close when there is no drum in recording position, and contact 109 is closed at the end of each recording operation.

Associated with the recorder is a drum changing relay 110, an end-of-message relay 111, and a phasing relay 112, the functioning of which will appear in the following description of the operation of the recorder.

Assume, therefore, that the patching cord has just been placed in turn in the jacks TJ1 and RJ1. The first operation at jack TJ1, as stated, energized the local jack busy lamp in all corresponding jack positions. The latter operation at jack RJ1 caused the positive battery at the contact of relay 60 to be removed, starting the calling transmitter, as previously described. The line I1, L2 is now extended to the amplifier 98L and the address code is transmitted to it, amplified, inverted and applied to the stylus 102. However, the drum 103 is at rest at this time. The armature of start relay SR is on its back contact at the time transmission starts but swings over to its front contact as soon as scanning the dark area 12 of the recording blank occurs. This applies charging battery to the grounded armature condenser 113. However, at the instant the current to relay SR is interrupted or reduced in value by movement of the dark area 12 out of the path of the scanning beam, relay SR releases, discharging the condenser 113 through the winding of relay 112. This relay locks up through its inner make contact to the left outer back contact of the end-of-message relay 111 and remains energized throughout the remainder of the transmission, irrespective of the action of relay SR. At its outer contact it applies battery to the phasing magnet 104 to energize the same and thereby cause the release of the drum stop arm, as described in the aforesaid Patent 2,255,868. Thereupon the receiving drum 103 starts to rotate in phase with the transmitting drum and the facsimile signals corresponding to both the coded address and body of the message are recorded upon the receiving blank on the drum 103.

At the completion of the transmission the end-of-message relay 111 operates. This may be effected through either one of two agencies, depending on which operates first. The recorder is provided with a pair of end-of-message contacts 109 which close on the completion of a predetermined scanning movement of the recorder, as fully set forth in the patent aforesaid. When these contacts close, ground is applied therefrom by conductor 114 to the winding of relay 111 to operate the same, this relay then locking up through its inner left hand armature and the outer make contact of relay 95, the latter of which remains operated as long as the plug remains in the jack TJ1. The end-of-message signal transmitted from the blank 10 is also adapted to operate and lock relay 111 through the response of the tuned relay TR to this signal, by way of conductors 115 and 114.

The operation of the relay 111 interrupts, at its outer left armature, the locking circuit for relay 112 which thereupon releases and interrupts the circuit to the phasing magnet 104, stopping the transmitting drum 103. At its right hand center armature, relay 111 applies negative battery to the conductor 100 and hence to the line L2. As explained in connection with the operation of the transmitter, this negative battery when received on the polar relay 51 (Fig. 4) stops the operation of the transmitter so that no further signals are transmitted over the line.

At the outer right hand armature, relay 111 applies battery to the left hand winding of the drum changing relay 110. Due to the inclusion of the condenser 116 in this circuit, this current is momentary but is sufficient to cause the relay to operate and lock up from ground at its inner armature over a circuit through the right hand winding of the relay, drum changing contact 107 and the outer right hand armature of relay 111. Relay 110 at its third armature applies ground to the half nut and stylus magnet 106 of the recorder thus lifting the stylus from the surface of the drum and disengaging the half nut magnet from the driving shaft during the drum changing operation. The scanning carriage is restored at this time to its initial or start position. Relay 110 at its second armature completes a circuit to the drum changing motor 105 which causes the drum changing cycle to occur, whereupon the recorded drum is removed from the machine and a fresh drum applied in recording position. Near the end of this drum changing operation, as appears more fully in the patent referred to, the contacts 107 momentarily open, thus interrupting the locking circuit to relay 110 and causing it to release.

Upon the release of relay 110 a circuit is extended from ground at the inner right hand armature of relay 111, outer armature of relay 110, conductor 117 and jack contacts 91L to the "Message Recorded" lamp 118L, signaling to the switchboard operator that the transmission has been completed and the recorder, by virtue of the drum changing operation, is in condition to receive another message. She thereupon removes the patching cord from jacks TJ1 and RJ1. The freeing of jack TJ1 opens the contacts 90L and 91L, extinguishing the "Message Recorded" lamp 118L at contact 91L and releasing the relay 95 at contact 90L. Relay 95, at its outer armature, unlocks the end-of-message relay 111 thus completely restoring the recorder to normal. At its inner armature, relay 95 extinguishes the local jack busy lamps 97L, 97'L, etc. at each of the jack positions.

*Trunk circuit numbering machine*

Let it be assumed that the code address of the next call received by the switchboard operator on the indicator 75 is for a distant station serviced by an outgoing trunk terminating in the transmitting jack TJ2, TJ12, etc. These jacks are constructed and multipled together in the same manner as jacks TJ1, TJ11, etc. The operator then plugs the patching cord between the calling jack and the idle trunk jack, such as TJ2.

The closure of jack contact 90T operates the busy relay 95T (Fig. 8) over the conductor 94T and relay 95T at its outer armature operates the trunk jack busy lamps 97T, 97'T, etc. at each position, over the conductor 96T. The inner armature of relay 95T serves to control the application of either positive or negative battery to the conductor TL1 of the outgoing trunk circuit TL1, TL2. The patching of the jacks RJ1 and TJ2 extends the incoming lines L1, L2 to the trunk circuit TL1, TL2 by way of conductors 92T and the amplifier 98T and starts the calling transmitter for operation thereover, as will subsequently appear.

Figure 8:
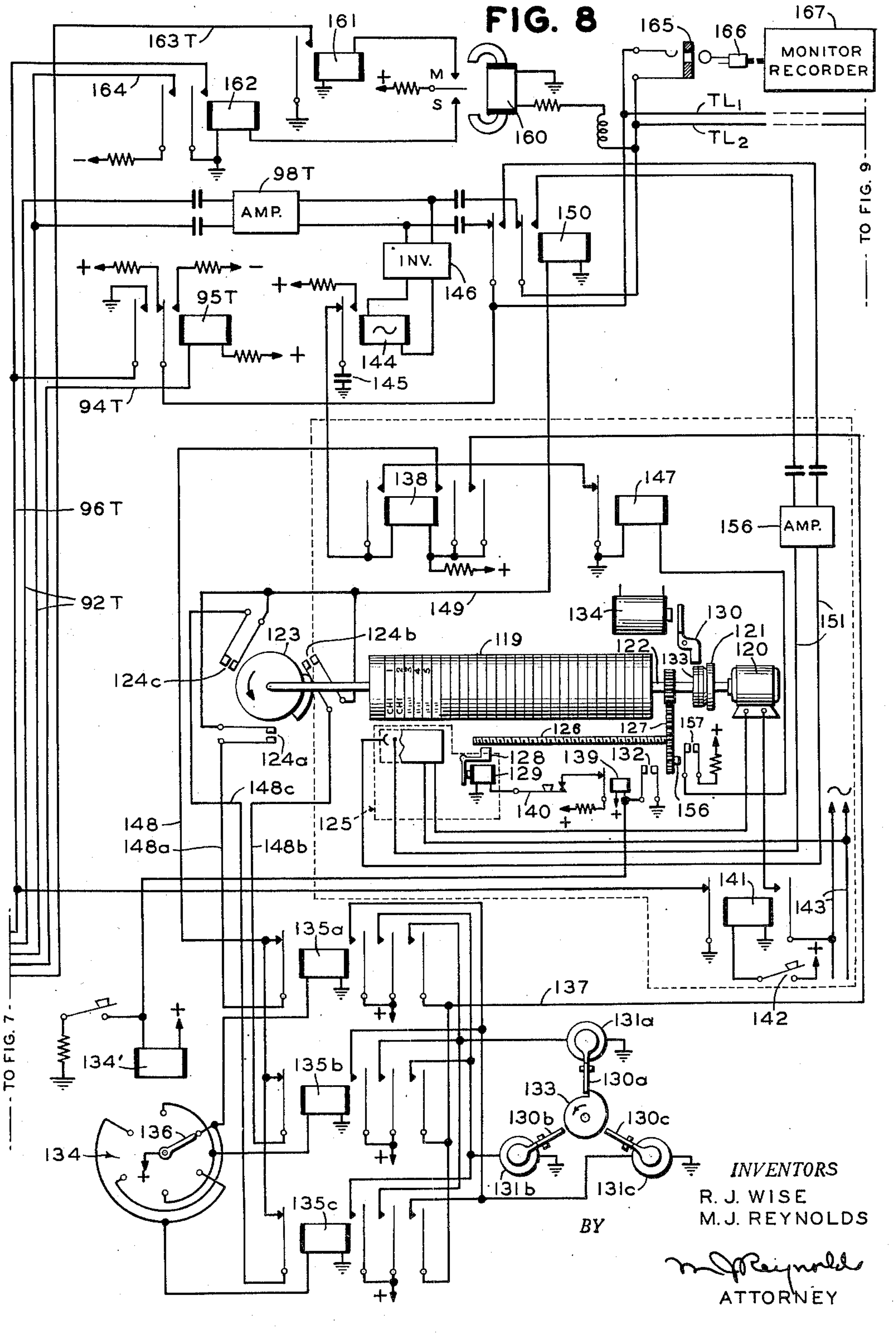
Fig. 8 shows diagrammatically an automatic means for numbering or identifying facsimile messages switched over an outgoing circuit.

It is desirable in connection with messages transmitted over these trunks to apply consecutive numbers to the outgoing messages in order that the operator at the receiving end may check to determine whether any messages have been lost in transmission. For this reason it is desirable to insert facsimile signals corresponding to these consecutive numbers, at the central office, preferably at the head of the message. In Fig. 8 an arrangement is shown whereby such numbers may be automatically incorporated with the facsimile signals being transmitted from the subscriber's transmitter. The arrangement is such that the numbers will appear on the message blank in a space corresponding to the dark zone 12 of the transmitting blank. It is also desirable for some purposes that the code address be transmitted to the station of destination, and therefore the arrangement is such that the trunk line is automatically switched between the numbering machine and the calling transmitter in phase with the scanning of the zones 12 and 13 respectively of the transmitted message blank.

The automatic numbering machine shown in Fig. 8 comprises an elongated cylinder 119 driven by a constantly running motor 120 through a friction clutch 121 controlled by suitable clutch magnet means, as will presently appear. The driven shaft 122 of the numbering machine carries a cam 123 thereon adapted to close a group of three equally spaced contacts 124*a*, 124*b* and 124*c*, during each revolution for an interval corresponding to the scanning of the area 12 of the blank at the transmitting station. The scanning carriage 125 includes the usual light beam, chopper disc, chopper motor and photocell, and is operated by the worm 126 driven by appropriate gears 127 from the shaft 122. The worm 126 is adapted to be engaged by the half nut 128 controlled by the half nut magnet 129.

Figure 10:
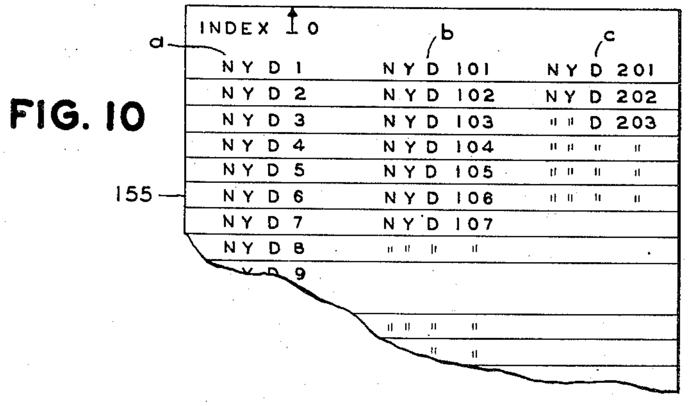
Fig. 10 is a fragmentary showing of a message number transmitting form usable in the apparatus of Fig. 8.

The consecutive numbers are suitably printed or otherwise recorded on a numbering sheet, a fragment of which is shown in Fig. 10, these numbers being arranged in three rows or columns, *a*, *b* and *c*, and including in addition to the number the usual station and circuit designations. As will appear, the arrangement is such that the drum 119 operates for a sufficient period following each selection of the trunk circuit to transmit a single number. After one column of numbers has been so transmitted, the drum 119 is indexed with respect to the transmitting cylinder so that the numbering proceeds from the second column and finally from the third column.

The indexing of the cylinder 119 is effected automatically by providing three equally spaced stop arms 130*a*, 130*b* and 130*c* about the periphery of the clutch stop disc 133, as shown diagrammatically in the lower right hand corner of the figure. The stop arm 130*a* serves as the index for the first or *a* column of numbers, 130*b* for the second or *b* column, and 130*c* for the third or *c* column. During the transmission of numbers from the first column *a*, the stop arms 130*b* and 130c are continuously held disengaged from the clutch disc so that the control of the disc is solely under the stop arm 130a. Similarly during the transmission of the second or b column of numbers the clutch disc is solely under the control of the stop arm 130b, and during the transmission of the third column of numbers the disc is solely under the control of the stop arm 130c. Each of the stop arms is provided with an operating magnet 131a, 131b, 131c, respectively. The numbering machine transmitter is provided with a pair of contacts 132 adapted to be closed by the scanning carriage at the completion of the transmission of the last number of each column. These contacts on each closing operate the stepping magnet 134' of a rotary switch 134, shown as having six contacts with the diametrically opposite contacts strapped together and connected respectively to three relays 135a, 135b and 135c. Battery is applied to the rotary switch arm 136 so that one or the other of these relays remains operated throughout the entire period of transmission of one or the other of the columns of numbers. Assume that the switch arm 136 is on the contact controlling relay 135a, which corresponds to the condition when transmission of the numbers is taking place from the first or a column thereof. With relay 135a operated, battery is applied through the first two inner right hand armatures thereof to the clutch magnets 131b and 131c, maintaining them continuously energized and their corresponding stop arms continuously disengaged from the clutch disc 133. At the outer right hand armature of relay 135a a circuit is extended from the clutch magnet 131a by way of the conductor 137 to the make contact of a clutch control relay 138, the operation of which will be subsequently described. Likewise the relay 135b applies battery to the clutch magnets 131a and 131c and extends the winding of clutch magnet 131b to the contact of the clutch control relay 138. Similarly relay 135c when energized applies battery to the clutch magnets 131a and 131b and extends the circuit from clutch magnet 131c to the contacts of control relay 138.

The half nut magnet 129 is continuously engaged with the worm 126 during the period of scanning each column of numbers and is released by the closing of contact 132 through a slow-to-release relay 139 to permit the scanning head to return to its initial position following the scanning of one column and prior to the scanning of the succeeding column of numbers. Relay 139 operates on the closing of the contacts 132 and holds operated sufficiently long to permit the scanning carriage to return despite the fact that the contacts 132 are opened at the start of this return movement. The return movement may also be effected by operation of the manual key 140.

Power is supplied to the numbering machine under the control of a magnet 141 and manual switch 142. With this magnet energized the driving motor 120, light beam and chopper motor are provided with power from the A. C. source 143. Relay 141 at its left hand armature also controls a circuit over conductor 98T to the "Busy" lamp 97T (Fig. 7) associated with each corresponding trunk jack so that these lamps become energized whenever power is removed from the numbering machine, as will hereinafter appear.

The numbering machine is phased with respect to the transmitting cylinder through an A. C. relay 144 which responds, similarly to the relay SR of Fig. 7, to the dark area 12 of the coded zone of the message blank, to charge a condenser 145. Relay 144 is released by the interruption of the signaling current supplied through the inverter 146 at the completion of the scanning of the dark area 12 of the message blank to cause the condenser 145 to discharge through the winding of the clutch control relay 138. This latter relay locks up through the back contact of a locking relay 147. As a consequence when the trunk jack is connected to the calling jack to start the distant transmitter, the signals from the coded area of the blank are amplified by the amplifier 98T and, through relay 144, serve to operate the clutch control magnet 138 to close its contacts. This operation occurs, as stated, at the completion of the scanning of the dark area 12 of the message blank. The relay 138 at its inner right hand armature completes a circuit from battery over the conductor 148 to the left front contacts of relays 135a, b and c, in parallel, and thence by conductors 148a, b and c to the cam contacts 124a, b and c, in parallel, and by conductor 149 to the line switching magnet 150. The magnet 150 when energized serves to transfer the trunk circuit TL1, TL2 from the calling line to the output circuit 151 of the numbering machine. At its outer right hand armature relay 138 applies battery over conductor 137 to one of the clutch magnets 131a, b or c, depending upon the position of the rotary switch 134, causing the drum 119 to be released for rotation with the particular column of numbers then being transmitted in phase with the dark area 12 of the transmission blank. As stated, the cam contacts 124a, b and c are closed once during each revolution but their effectiveness upon the switching relay 150 is dependent upon the energization of one of the magnets 135a, b or c so that the switching relay 150 is actually operated only once during each revolution and, as stated, in phase with the scanning of the dark area 12 of the message blank. During the time relay 150 is operated transmission occurs from the numbering machine drum 119 and, due to the indexing thereof, only from the proper column of numbers. The consecutive numbers are therefore interposed between the successive groups of code impulses. The transmission from the numbering machine continues until the complete number has been transmitted. This is effected by allotting to each consecutive number on the sheet 155 a distance, lengthwise of the sheet, equal to the pitch of the worm 126 and causing the worm to make one complete revolution for each number transmitted. For this purpose a cam element 156 on the gear 127 acts to close momentarily a pair of contacts 157 during the last revolution of the drum 119, in each cycle. Contacts 157, on closing, operate the locking relay 147 to unlock relay 138 and thus interrupt the circuit previously established to the particular step magnet 131a, b or c, then in control of the clutch 133. The numbering machine thereupon stops at the end of the revolution, with contacts 157 open, in readiness to transmit the next number. The circuit to the switching magnet 150 is opened at the inner right hand contact of the magnet 138 so that thereafter transmission over the trunk TL1, TL2 occurs solely from the distant or subscriber's transmitter.

Before describing the distant recorder and the arrangement at the receiving station, it should be noted that a polar relay 160 is provided at the switching office having its winding connected between ground and the trunk conductor TL2. The marking contact M of this relay is connected through the winding of a relay 161 and the spacing contact S is connected through the winding of a relay 162, so that battery applied at the tongue of the relay will operate the relays 161 or 162 depending on the position of the armature. Relay 161 when energized serves to operate the "Message Recorded" lamp 118T, of Fig. 7, associated with the jack TJ2. This circuit extends from the front contact of relay 161 over conductor 163T and jack contacts 91T to battery at the lamp 118T. Relay 162 at its inner armature applies ground to the busy lamps 97T, associated with the jacks TJ2, TJ12, etc., this circuit being completed over conductor 96T. At its outer armature and front contact relay 162 applies negative battery over the conductor 164 and one of the conductors 92T, which may be traced through to the line L2 extending to the subscriber's station. The operation of the polar relay 160 is controlled from the distant recorder and will be described in connection with the operation of the recorder.

Also bridged across the trunk circuit TL1, TL2 is a jack 165 adapted to receive the plug 166 for connecting a monitoring recorder 167 to the outgoing circuit, if desired.

*Remote trunk recorder*

Figure 9:
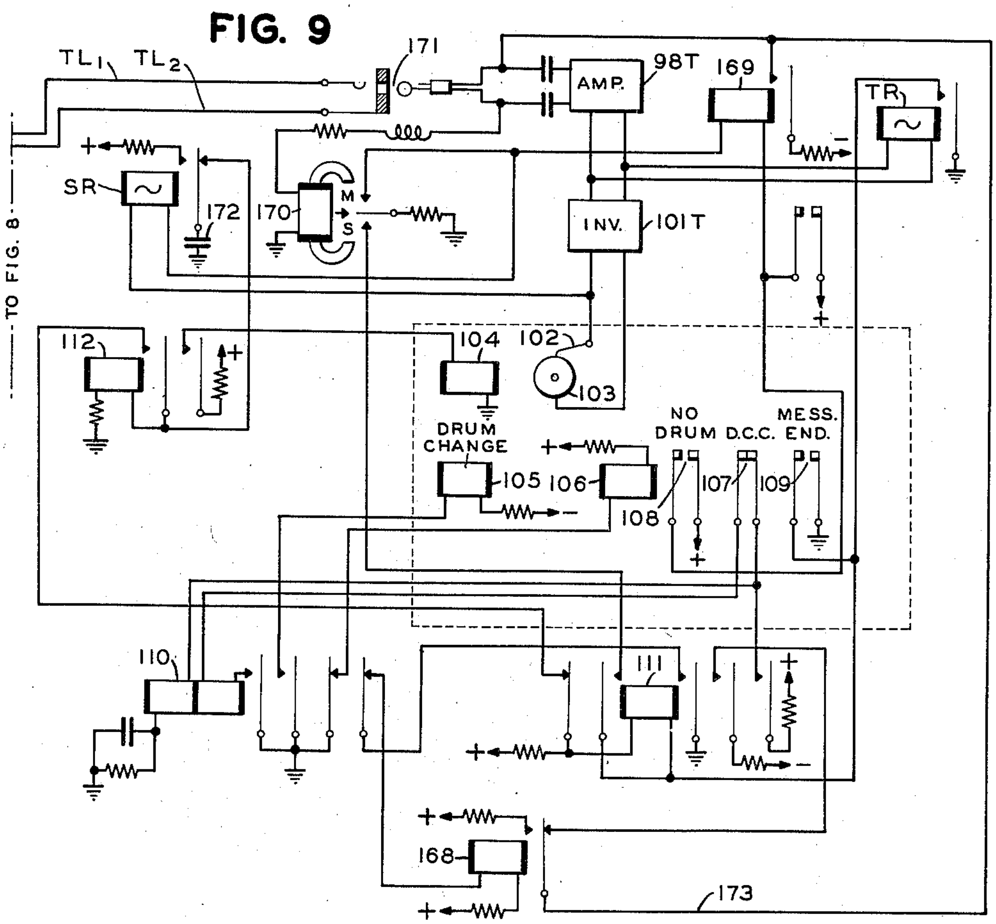
Fig. 9 is a circuit diagram of the facsimile recording mechanism and control means at the distant end of the outgoing circuit.

The recorder at the receiving station at the terminal of the trunk line TL1, TL2 is shown in Fig. 9. It comprises a drum changing facsimile recorder of the same type as shown in Fig. 7, including the drum 103, associated stylus 102, phasing magnet 104, drum changing magnet 105, stylus and half nut magnet 106, and the drum changing contacts 107, no drum contacts 108, and message-end contacts 109. In addition a number of control relays are provided similar to the relays SR, 112, 110 and 111 of the local recorder of Fig. 7 and similarly indicated in Fig. 9. Additional signal control relays 168 and 169 are also provided together with a polar relay 170, the latter of which has its winding connected between ground and the line conductor TL1. The recorder of Fig. 9 is adapted to be connected to the trunk circuit TL1, TL2 through a jack and plug 171, a receiving amplifier 98T and an inverter 101T.

When transmission is started over the trunk line TL1, TL2, the first signals consist of the coded address transmitted from the zone 11 of the message blank. The relay SR in response to the dark area of this coded zone operates to its front contact so as to charge the condenser 172 connected between its armature and ground, and upon interruption of current at the end of the dark area of the coded zone this relay releases and discharges condenser 172 through the relay 112 in the same manner as described in connection with Fig. 7, thus operating the phasing magnet 104. The recorder thereupon starts to operate and records the number transmitted from the numbering machine at the central office with the coded address interspersed therewith, then the body of the message and the end-of-message signal. At the completion of transmission the relay 111 is operated either by the tuned magnet TR in response to the received end-of-message signal or through the closing of the end-of-message contacts 109, whichever occurs first. Relay 111 locks up through the inner left hand make contact to the spacing contact of polar relay 170. This relay is held on this contact at this time by the negative battery transmitted over the trunk conductor TL1 from the make contact and inner armature of the relay 95T associated with the jack TJ2 (Fig. 8). Relay 111 at its outer left hand armature unlocks the relay 112 in the same manner as at the local transmitter described in Fig. 7 and at its outer right hand contact energizes the drum changing relay 110 which effects the drum changing operation in the manner previously described. At its middle right hand armature relay 111 applies negative battery through the back contact of relay 168 and conductor 173 to the conductor TL2 of the trunk circuit. At the switching office this operates the polar relay 160 (Fig. 8) to its spacing side, which energizes relay 162 and this in turn, as stated, applies negative battery through its outer armature to the line L2 to the subscriber's transmitter, bringing this transmitter to rest and discontinuing the transmission therefrom. At its inner right hand armature relay 111 (Fig. 9) applies ground through the back contact and outer right hand armature of relay 110 to the winding of relay 168. This relay does not operate, however, until the drum changing operation has been completed at which time the relay 110 falls back and operates relay 168. Relay 168 is sufficiently slow, however, so that it was not operated between the time relay 111 first operated and the resulting operation of relay 110. The operation of relay 168 applies positive battery through the conductor 173 to the trunk conductor TL2 to operate the polar relay 160 (Fig. 8) ot its marking side, thus deenergizing relay 162 and operating relay 161. The release of relay 162 removes the negative battery from the line L2 and the operation of relay 161 applies positive battery to the conductor 163T leading to the "Message Recorded" lamp at the switchboard. The operator at the switchboard, noting that transmission has been completed, may pull down the patching cord. When the plug is removed from the jack TJ2, relay 95T releases, disconnecting the ground at its outer armature from the busy lamps 97T at each corresponding jack and applying positive battery at the back contact and inner armature thereof to the line TL1. At the recording station this positive battery operates polar relay 170 to its marking contact and thus applies ground through the winding of magnet 169 to the contacts 108. Should these contacts be closed due to the absence of a recording drum, indicating that the recorder is not in condition to receive, relay 169 operates and again applies negative battery to the trunk line conductor TL2 to again operate relay 160 to its spacing contact and thus to operate relay 162. At its inner armature relay 162 applies ground to the busy signal 97T associated with each of the jacks. The negative battery at the outer tongue of relay 162 is not applied to the line conductor L2 at this time, however, since the jack TJ2 is unoccupied. As soon as a new supply of message cylinders is provided at the recorder, the no-drum contacts 108 open to remove negative battery from the conductor TL2 thereby to release relay 162 and remove the busy signal at the various jack positions.

*Storage mechanism*

If, when an incoming call is registered on the indicator 75, there is no idle circuit available for the message to be transmitted, the switchboard operator may divert it to a storage medium and retransmit it when a channel becomes available. If desired, one unit of the selecting code, for instance, the eighth, may be used to indicate the preferred or deferred nature of the message so that when the traffic is heavy, deferred messages may be stored at the central office for transmission during periods of lighter loads, thus conserving the trunk circuits for preferred messages.

Figure 11:
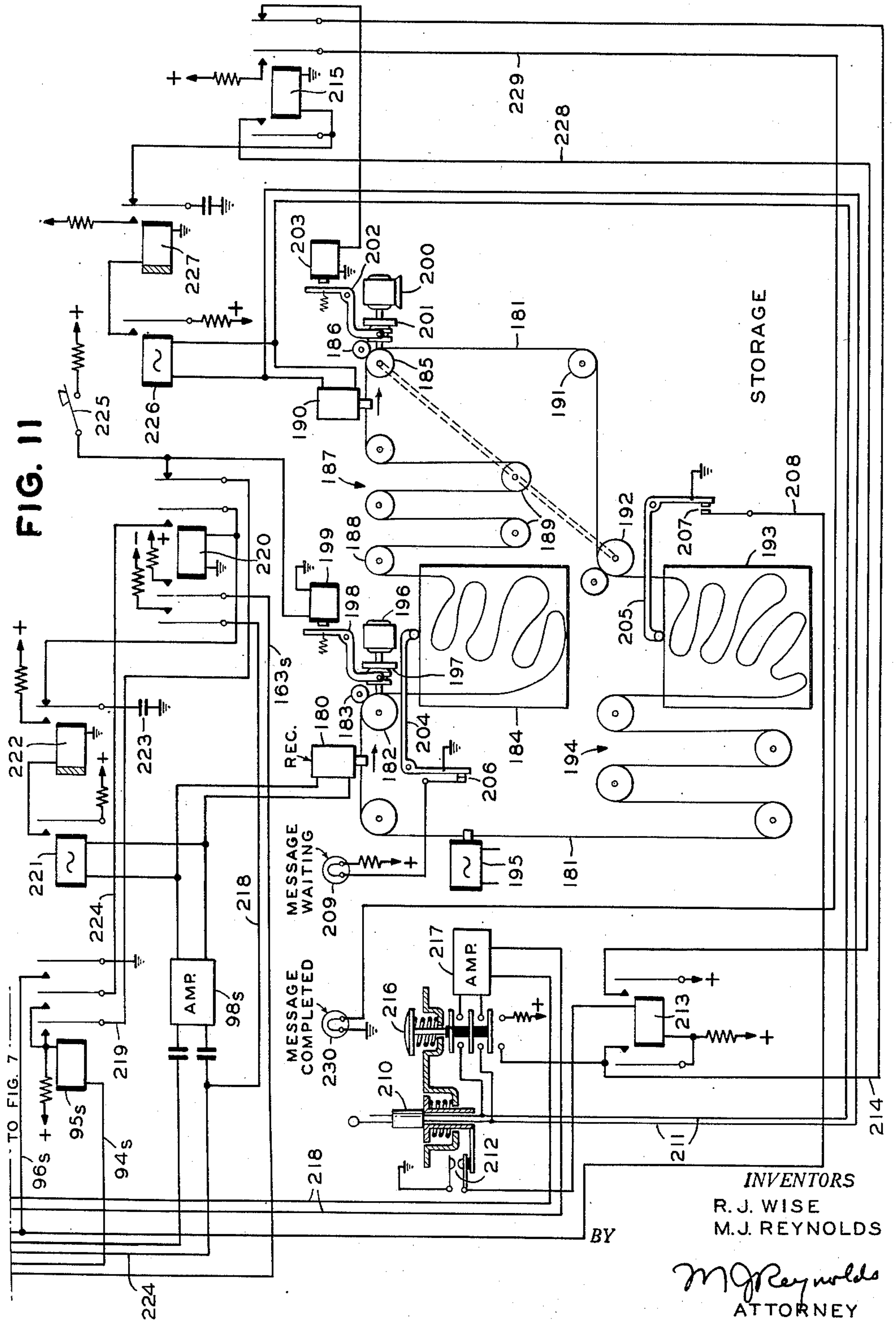
Fig. 11 shows diagrammatically a form of facsimile storage apparatus and the associated retransmitting cord circuit.

In Fig. 11 we have shown a magnetic wire or tape type of signal storage suitable for the above purpose. The storage jacks TJ4, TJ14, etc. (Fig. 7) are multipled at the various jack positions in the same manner as the local and trunk line jacks, and provided with similar "Busy" and "Message Recorded" lamps. The "Busy" lamps 97*s*, 97'*s*, etc. at each position are operated from the contacts of the busy relay 95*s* (Fig. 11) over conductor 96*s*, relay 95*s* being operated from the jack contacts 90*s* over conductor 94*s* and jack contacts 90*s*, in the same manner as described with reference to the local and trunk line jacks. The "Message Recorded" lamp 118*s* of the occupied jack is energized through the contacts 91*s* of its associated jack under the control of the storage mechanism, as will later appear. Jacks TJ4, TJ14, etc. extend the incoming circuit, such as L1, L2, by means of the patching cord, to the input of the amplifier 98*s* (Fig. 11) and thence to the recording magnet 180 of the storage device.

The storage means includes an endless magnetic storage medium, which may be in the form of a tape 181 either of steel or of other flexible material coated with a layer of iron particles capable of being selectively magnetized by the applied signals. The tape 181 passes from the recording position at magnet 180, between a drive roller 182 and associated pressure roller 183, and thence into an accumulator or storage receptacle 184. The accumulator may be similar to that used in the storage of perforated telegraph code tape, as shown in Patent No. 2,259,517, to Drenkard. Briefly, it consists of a box having its front and back walls spaced apart a distance slightly greater than the width of the tape. An accumulator of this type approximately a foot square will hold several hundred feet of tape. The tape is drawn from the accumulator by a drive roller 185 and associated pressure roller 186 and passes through a second storage section 187 comprising a series of rollers 188 carried on fixed shafts and weighted rollers 189 carried in the tape loops. The storage 187 is of sufficient capacity to hold one complete facsimile message. The pickup or transmitting magnet 190 is disposed ahead of the drive roller 185. From the drive roller 185 the tape passes around any suitable arrangement of idler rollers, such as roller 191 to a third drive roller 192, from which it is passed into a second accumulator 193 and thence through the single message storage section 194 and past the "erasing" magnet 195.

The receiving drive roller 182 is driven from a continuously operating motor 196, through a friction clutch 197 controlled by a stop arm 198 and associated clutch magnet 199. The transmitting drive roller 185 is driven by a motor 200 through the friction clutch 201 controlled by the stop arm 202 and clutch magnet 203. Drive roller 192 may be conveniently geared to roller 185. The drive rollers may take the form of toothed wheels engaging in perforations in the tape as is well known in the art.

Disposed across the inlet of the accumulators 184 and 193 are the tape levers 204 and 205, respectively, the arrangement being such that when the tape supply in either of the accumulators is exhausted, the tape lever will be raised to open the contact 206 associated with lever 204 and to close the contact 207 associated with lever 205.

The purpose of lever 205 is to control the "Busy" lamp associated with the storage jacks so that it will indicate a busy condition when there is insufficient available tape ahead of the recording magnet 180 to record a complete message. With no tape in the accumulator 193 and contacts 207 closed, ground will be applied by the wire 208, to the busy conductor 96*s*, energizing the busy lamp 97*s* at each jack position.

The lever 204, through its contacts 206, controls a "Message Waiting" lamp 209 associated with the transmitting plug 210 of the storage device. Plug 210 is connected by conductors 211 to the terminals of the "transmitting" magnet 190. As long as any tape is available in the accumulator the contacts 206 will be closed and lamp 209 lighted, indicating the presence of a completely stored message available for retransmission.

The plug 210 is weighted and serves when seated, as shown, to hold open the spring urged contacts 212 so that whenever the plug is lifted to make a connection, as to one of the outgoing trunk jacks TJ2, etc., a relay 213 will be operated. This relay at its left armature completes a circuit from battery over conductor 214 and the outer right armature and back contact of relay 215 to the clutch magnet 203.

A push button switch 216 is also provided adjacent the plug position and serves when depressed to complete at its lower contacts the above clutch magnet circuit, and at its two upper sets of contacts, to connect the retransmitting circuit 211 to the input of the amplifier 217, the output of which is connected by conductors 218 to the input of the detector 65 (Fig. 5) of the code detecting apparatus.

The clutch magnet 199 at the recording side of the storage medium is operated from battery at the inner armature and make contact of relay 95*s*, conductor 219, and the outer armature and back contact of a relay 220. Relay 95*s*, it will be remembered, was operated by the occupation of jack TJ4 by the plug of the patching cord, so that the plugging-up operation automatically starts the recording operation. The function of the remaining relays and circuits associated with the storage device will become clear from the following description of the operation of the storage means.

Assume that the operator has just patched her cord between the incoming lines L1, L2 and the storage jack TJ4. The insertion of the plug in the incoming jack RJ1 removes positive battery from line L2, as before described, and causes the scanning of the transmitting drum at the subscriber's station to start, thereby transmitting the switching code followed by the body of the message, and completed by the end-of-message frequency.

The occupation of the plug in the jack TJ4 operates relay 95*s*, as described, lighting the busy lamp 97*s* at all corresponding jack positions and energizing the clutch magnet 199 of the storage recorder. The signals received over line L1, L2 are amplified at 98*s* and applied to the recording magnet 180 and recorded as magnetic variations in the tape 181. This recording continues until the end-of-message frequency is received.

A tuned relay 221, responsive to this frequency only, is connected across the output of amplifier 98s and upon reception of the end-of-message signal operates a slow-to-release relay 222. Relay 222 picks up and charges its armature condenser 223 during the period of transmission of the end-of-message signal. When the transmission of this signal is completed, relay 222 again releases, discharging the condenser 223 through the winding of relay 220. Relay 220 operates and locks up through its inner right hand armature, conductor 224 and middle armature of relay 95s, to battery. At its outer right hand armature, relay 220 interrupts the energizing circuit to the clutch magnet 199 causing the stop arm 198 to release and stop the ribbon feed. However, by virtue of the slow-to-release characteristic of relay 222 a short interval of blank tape is advanced past the recording position following the termination of the end-of-message signal, thus separating the received message slightly from the succeeding message.

Relay 220 at its left hand inner armature applies battery to the conductor 163s to energize the "Message Recorded" lamp 119s, thereby signaling the operator that the connection may be broken down. At the same time negative battery is applied from the left hand outer armature of relay 220 to the conductor 224 and thence to the line L2 extending to the subscriber's station. As heretofore described, this negative battery stops the operation of the distant transmitter.

When the operator removes the plug from the jack TJ4, relay 95s is deenergized, interrupting the locking circuit to magnet 220 and also extinguishing the busy lamp at each jack position.

A manual switch 225 is provided to advance blank tape past the recording position, when desired, in order to permit the last recorded message to be moved into retransmitting position.

In retransmitting a message from the storage tape, the operator, noting the "Message Waiting" lamp, momentarily depresses the switch 216 and reads the code address of the stored message on the indicator 75. She then lifts the plug 210 and plugs it into the appropriate outgoing jack, for instance, trunk jack TJ2. The lifting of the jack permits contacts 212 to close, operating magnet 213 and through its left hand armature, operating the transmitting clutch magnet 203 to release the clutch 201 and start the advancement of tape past the transmitting magnet 190. The stored signals are thus transmitted over conductors 211, the plug 210, jack TJ2 and out over the trunk TL1, TL2. The message numbers are automatically inserted by the numbering machine associated with the selected trunk and the complete message with number and code address is recorded at the distant station.

A tuned relay 226, responsive only to the end-of-message frequency, is connected across the output of the retransmitting magnet 193 and serves to operate relay 227 during the transmission of the end-of-message signal. At the completion of the end-of-message signal relay 227 releases to operate magnet 215, in the manner described in connection with relay 220, to thereby interrupt at its outer right hand armature the circuit to the clutch magnet 203 and stop the advancement of the tape. Relay 215 locks up at its left armature, conductor 228 and the right armature and contact of relay 213 until the operator restores the plug 210 to its seat. Relay 215 at its inner right hand armature completes a circuit from battery, over conductor 229 to the "Message Completed" lamp 230 at the switchboard position, indicating to the operator that the connection may be broken down.

It will be understood, of course, that in place of terminating the output conductors 211 of the retransmitting magnets in plugs 210, they could equally well have been terminated in jacks, such as RJ3, at the switchboard, and the connections to the outgoing circuit made by patching cords.

*Plural switching*

Figure 12:
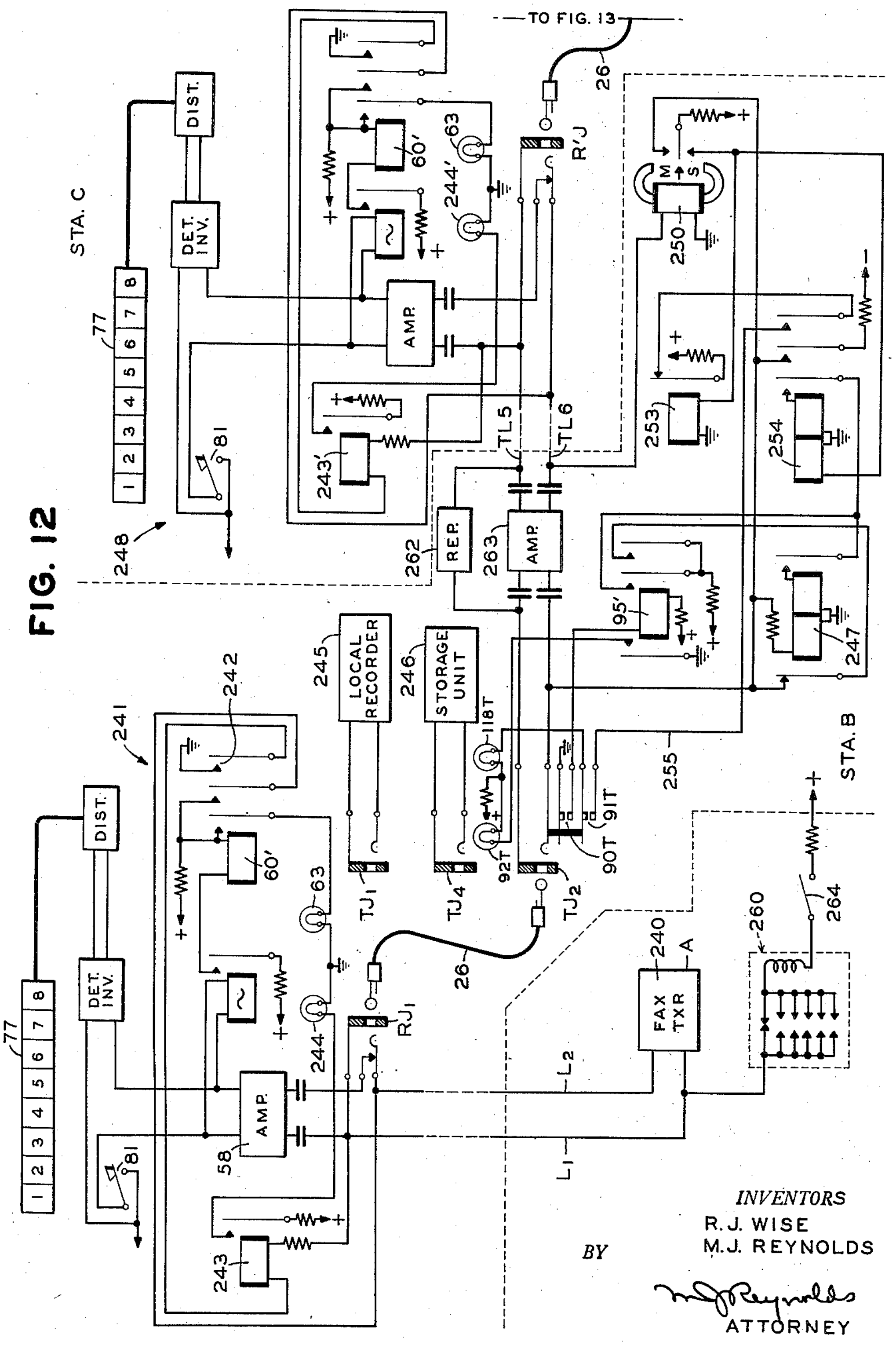
Figs. 12 and 13, together, show a system for extending calls through several manual switching centers, from the transmitting station to the station of destination.
Figure 13:
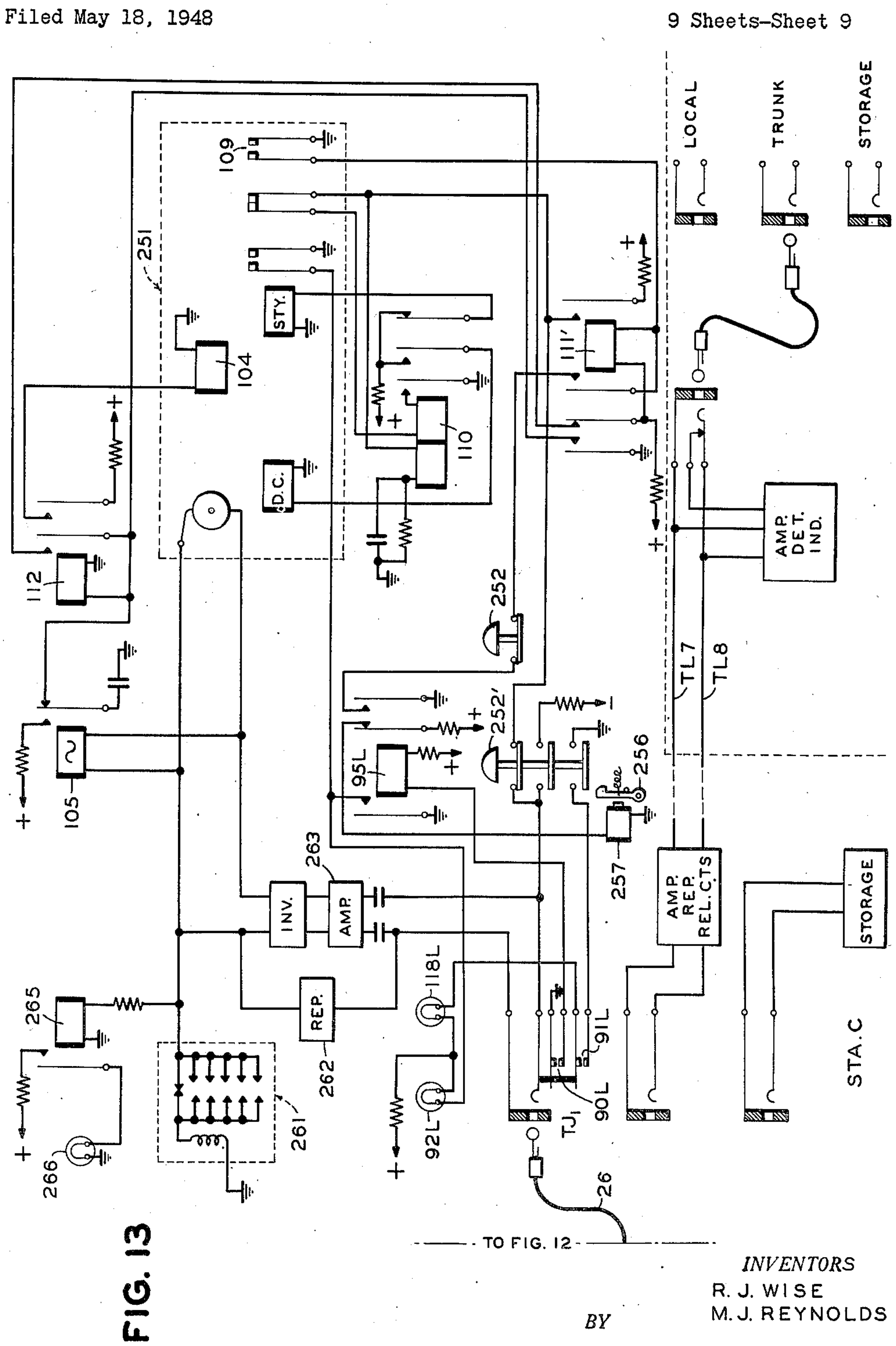

In Figs. 12 and 13 there is shown a modification of the invention which permits the switching connection to be completed from the facsimile transmitter, through a plurality of switching offices, to the recorder at the station of destination of the message. This is facilitated by that aspect of the invention which permits the code address to be transmitted continuously during the entire period of setting up of the switching connections irrespective of the time involved.

In this modification the facsimile transmitter indicated by the box diagram 240 is identical with the apparatus and circuits shown in Fig. 4 and is connected by the lines L1, L2 to the jack RJ1 at the first switching station. The call and indicating mechanism 241 at this station is identical to the call and indicator equipment shown in Fig. 5 with the exception that an additional contact 242 has been added to the relay 60′ to control the operation of a magnet 243 for operating a signal lamp 244, the purpose of which will appear hereinafter. At the switching station the transmitting jacks TJ1, TJ2, TJ4 are constructed and multipled to other switching positions in the office in the same manner as shown in Fig. 7, and the apparatus and circuits for both the local recorder 245 and the storage device 246 are identical with the local recorder of Fig. 7 and the storage equipment of Fig. 11. The control relays associated with the trunk jack TJ2, however, are somewhat different from those shown in the trunk jack circuit of Fig. 8, and the functioning of these control relays and circuits will be best understood by describing the operation thereof in connection with a switching connection. Thus, when a call is initiated from the facsimile transmitter 240, the signal light 63 operates, as heretofore described, and the switching operator actuates the key 81 to cause the code address to be shown on the indicator 77. If the code address indicates a local recorder or a called station which is busy, the patching cord 26 is plugged either into the local jack TJ1 or the storage jack TJ4, and the operation proceeds in exactly the same manner heretofore described. However, if the message is destined for an idle station serviced by the trunk jack TJ2 over the trunk line TL5, TL6, the operator patches the cord between the jacks RJ1 and TJ2. The sequence of operation is to insert the plug of the patching cord first into jack TJ2 and immediately thereafter into the jack RJ1. The insertion of the plug into TJ2 operates the jack contacts 90T and 91T in the manner previously described, and the closing of contacts 90T operates the relay 95′ as heretofore explained, thereby to energize the busy lamp 92T at its left hand armature. At its outer right hand armature relay 95′ applies positive battery through the back contact of a relay 247 to the tip contact of the jack TJ2 from which it is extended through the patching cord to the line L2 as soon as the patching connection has been completed at jack RJ1. This positive battery replaces the positive battery previously applied from the middle armature of the relay 60′ and which is removed at the time the patching cord is plugged into the jack RJ1 through the interruption of the signaling circuit to the amplifier 58. In view of this continuous application of positive battery to the line L2, the facsimile transmitter continues to rotate idly and to transmit successively the code address. This code address is extended over the trunk TL5, TL6 to the second switching station C. The terminating jack R′J at this station is provided with call and indicator equipment 248 identical with that at station B and the extended code address signals operate the relay 60′ at this station to apply positive battery through the middle contact of this relay to the trunk circuit TL6 and also at its inner right contact to cause the call lamp 63 to become energized. The positive battery applied to TL6 operates a polar relay 250 at station B to its marking contact causing the operation of relay 247, this latter relay locking up through its right hand winding to the inner right armature of relay 95′. Relay 247 removes the positive battery applied through its left hand contact from the line L2 but this positive battery is replaced by the positive battery at the tongue of the polar relay 250. Thus any further application of positive battery to the line L2 is controlled solely by the relay 250.

The operator at station C in response to the lighting of lamp 63 depresses the indicator key 81, reads the code address on the indicator 77, and extends the circuit through the patching cord 26 to the next section of the connection. This may be a trunk circuit TL7, TL8 (Fig. 13) identical with TL5 and TL6 and equipped with identical control apparatus and circuits. However, for the present purpose let it be assumed that the message is destined for a local recorder at station C, such as is serviced by the jack TJ1 at this station. The operator then inserts the patching cord into the jack TJ1 and thereafter into the jack R′J. The facsimile recorder associated with the jack TJ1, included within the dotted rectangle 251, is identical with that previously described, but the control circuits for this recorder are somewhat different than heretofore referred to. When the plug is inserted in the jack TJ1, the jack contacts 90L, 91L are operated, the former of which operates the relay 95L to operate the busy lamp 92L through its left armature in the usual manner. There is no battery, however, applied to the tip of the local jack at this time and since positive battery was removed from the line TL6 by interruption of the circuit to amplifier 58 upon the insertion of the plug in the jack R′J, this patching operation serves to remove all battery from the trunk conductor TL6. At station B this causes the polar relay 250 to move to its mid-position thereby removing positive battery from the tip of the jack TJ2 and through the patching cord from the line L2 whereupon the scanning operation of the transmitter is started as previously described. The code address is first transmitted and acts as previously described through the relays 105 and 112 to release the phasing magnet 104 to start operation of the recorder. The message is thus received upon the recorder in the same manner as it is received upon the local recorder in Fig. 7, and at the end of this operation the message-end contacts 109 close to operate the end-of-message relay 111′. Relay 111′ at its outer right hand armature operates the drum changing relay 110 which functions as in Fig. 7 to complete a drum changing operation. Relay 111′ locks up through its inner right hand armature, the push button switch 252 and the outer right hand armature of relay 95L. At its middle left hand armature relay 111′ interrupts the locking circuit for the phasing relay 112 causing the operation of the recorder to cease, and at the make contact and outer left hand armature relay 111′ applies ground to the ungrounded terminal of relay 112 thereby shunting out this relay from control of the relay 105. This prevents further response of relay 112 and restarting of the recorder as long as relay 111′ remains locked up. The positive battery supplied through the right hand armature of relay 111′, in addition to operating relay 110 to initiate the drum changing operation as heretofore described, is extended through the upper left hand contacts of push button switch 252′ to the tip of the jack and thence through the patching cord to the line TL6, again operating the polar relay 250 at station B to its marking contact and reapplying positive battery over the line L2 extending to the transmitter.

Referring to Fig. 4, this positive battery operates the polar relay 51 at station A to its marking side re-energizing relay 53 and thus opening at the outer armature of this relay the circuit from the secondary of the transformer 55 to the half nut magnet 56 whereupon this magnet withdraws the half nut 36 from the worm 37 causing the scanning carriage to return to its uppermost position. The drum 27, however, continues to rotate so that the code address is again transmitted over the circuit. It is ineffective at the recorder, however, to release the phasing magnet due to the shunting arrangement of the phasing relay 112 as previously described.

The operator at the recording station is now free to inspect the message received and either to effect a repetition of this message or to release the circuit as desired. Should it be desired to obtain a second copy of the message, the push button 252 is depressed momentarily to unlock the magnet 111′ whereupon the short-circuiting ground of relay 112 is removed and this relay again responds to the phasing pulse being transmitted from the code address portion of the message blank. This releases the phasing magnet 104 again and the entire recording cycle is repeated.

Should this or the preceding message have been satisfactory, the recording operator then releases the connection by depressing the push button 252′. At its upper contacts this switch removes the positive battery from the line TL6 and at its middle contacts applies negative battery through the jack TJ1 to the line TL6 causing polar relay 250 at station B to move to its spacing side S, thereby operating the magnets 253 and 254 disposed in parallel with the spacing contact S. Magnet 254 locks up through its right hand or holding winding to the inner right armature of the relay 95′ and prepares a circuit from the back contact of relay 253, outer armature and make contact of relay 254, conductor 255, jack contacts 91T to the message recorded lamp 118T. This lamp, however, does not operate at this time. At its middle armature relay 254 applies negative battery to the tip of the jack TJ2 and thence through the patching cord to the line L2. At the facsimile transmitter of Fig. 4 this negative battery serves to operate the locking magnet 45 as heretofore described to interrupt the operation of the transmitter.

The push button switch 252′ at station C is latched in its depressed position by a latch member 256 controlled by a magnet 257 from the back contact and inner right armature of relay 95L and stays depressed until the patching cord 26 is removed from the jack TJ1 at station C thereby to release relay 95L. At its lower contacts the push button 252′ completes a circuit from ground through the jack contacts 91L to the message recorded lamp 118L thereby signaling the operator that the recording operation has been completed, whereupon the patching cord may be removed from the jacks TJ1 and R′J at this station C. The former operation opens the contact 90L to release the relay 95L thereby at its left armature extinguishing the busy lamp, at its outer right armature unlocking the relays 111′, and at its inner right armature operating the push button magnet 257 to release the push button 252′. The recorder is now restored to normal and may be used for a subsequent switching operation. The removal of the cord 26 at station C from the jacks TJ1 and R′J also removes negative battery from the conductor TL6, causing the polar relay 250 at station B to move from its spacing contact to its mid-position whereupon the relay 253 releases and completes a circuit from battery through the outer right hand armature of the locked up relay 254 and the jack contacts 91T at station B to the message recorded lamp 118T. This signals to the switching operator at station B not only that the recording has been completed but that the connection at the opposite end of the trunk circuit has been pulled down. The operator at station B thereupon removes the patching cord connecting the jacks TJ2 and RJ1. This releases the relay 95′ by the opening of contacts 90T. Relay 95′ at its left hand armature extinguishes the busy lamp 92T and at its inner right hand armature unlocks relays 247 and 254, restoring the associated control circuits to normal. The trunk circuit TL5, TL6 is thus again free for a subsequent switching operation.

It will be noted that the control potentials for both the operation of the message recorded lamp 118T and for the stopping of the operation of the transmitter have been effected over one conductor only of the circuit, namely, the conductor associated with the tip of each jack. By virtue of this arrangement it is possible to utilize the other conductor of the circuit, namely, the conductor associated with the ring contact of each jack, for through D. C. telegraph communication between the transmitting station and the recording station. The apparatus required for this comprises a keyboard printer 260 connected to the conductor L1 at the transmitting station (Fig. 12) and a similar keyboard transmitter 261 connected to the ring of the jack TJ1 at the recording station C (Fig. 13). In addition D. C. telegraph repeaters 262 are bridged across each of the trunk circuit amplifiers 263 at stations B and C. Thus after a switching connection has been set up in response to the facsimile code address and during the transmission of the facsimile message, the operator at station A may carry on telegraph communication with the operator at station C in one direction at a time over the conductor associated with the ring contact of all the jacks included in the switching connection.

At each switching point it is contemplated that signal storage devices will be employed and whenever a switching connection is established through a portion of the system and it is found that it can not be completed through a further portion because there are no idle facilities, the incoming call may be switched to the storage medium so that the trunk circuits already set up will not be busied longer than necessary. However, at times when it is desired to carry on telegraph communication as well as facsimile communication, it is essential that the through connection be completed if possible even though some delay in waiting for an idle trunk or an idle recorder may be entailed. Provision is therefore made to indicate to the switching operator at each station that such telegraph communication is desired. This is the purpose for which the signal lamp 244 is provided adjacent each of the incoming jacks. When the transmitting operator at station A, for instance, desires to communicate by telegraph with the station of destination, she closes the switch 264 to apply battery through the transmitting contacts of the printer to the line L1 and at the same time starts the facsimile transmitter into operation. Relay 60′, operating in response to the facsimile call signals, completes a circuit from battery at the transmitting station, switch 264 and line L1 to relay 243 and thence through the outer right hand contact of relay 60′ to ground. Relay 243 thus operates to energize the lamp 244 thereby signaling the operator that a through connection is desired. A similar relay 243′ and signal lamp 244′ is provided at the receiving end of each trunk circuit and positive battery applied by the transmitting operator to the line L1 is repeated by the repeater 262 over the trunk circuit TL5 to operate the relay 243′ thereby to energize the signal lamp 244′. The operator at each switching point therefore makes the current call a preferred call and completes the through switching operation at the earliest possible moment. When the through connection has been established, as for instance, to station C, the battery applied over the trunk circuit TL5 is extended through the ring of the jack TJ1 at this station to operating relay 265 associated with the printer 261. Relay 265 in turn energizes the call lamp 266 at the recording position. The operator at the recording position acknowledges the call by opening the printer contacts in the normal manner and thereafter telegraph communication may be conducted one way at a time between the called and calling stations. It will be understod, however, that if desired the telegraph circuit between the called and calling stations may be duplexed to permit simultaneous two-way communication. It will be further understood that the switching operation may be set up through the coded address blank purely for the purpose of telegraph communication even though there is no facsimile message to be transmitted.

The term "facsimile message" as used herein and in the claims is intended to cover any form of facsimile subject matter to be transmitted and recorded whether in the form of picture, drawing, or text.

What is claimed is:

1. A facsimile switching system comprising a facsimile transmitter having elemental area scanning mechanism, means in said transmitter for supporting a facsimile transmitting blank having thereon a predetermined coded area, a transmitting circuit for said transmitter, means for starting said scanning mechanism into operation to scan said coded area and to transmit code signals therefrom over said transmitting circuit a code indicator associated with said circuit for indicating the transmitted code, a plurality of facsimile recorders and switching means for connecting said circuit selectively to any one of said recorders in accordance with the indication of said code indicator.

2. A facsimile switching system comprising a facsimile transmitter having elemental area scanning mechanism, means in said transmitter for supporting a facsimile transmitting blank having thereon a predetermined coded area and a message area, a transmitting circuit for said transmitter, means for starting said scanning mechanism into operation to scan said coded area, means to restrict said operation to said coded area and to transmit code signals therefrom over said transmitting circuit, a code indicator associated with said circuit for indicating the transmitted code, a plurality of facsimile recorders, a switching center at which said circuit terminates, switching means at said center for connecting said circuit selectively to any one of said recorders in accordance with the indication of said code indicator and means at said switching center for controlling said scanning mechanism to scan said message area.

3. A facsimile switching system comprising a facsimile transmitter having elemental area scanning mechanism, means in said transmitter for supporting a facsimile transmitting blank having thereon a predetermined coded area and a message area, a transmitting circuit for said transmitter, means for starting said scanning mechanism into operation to scan said coded area, means to restrict said operation to said coded area and to transmit code signals therefrom over said transmitting circuit, a code indicator associated with said circuit for indicating the transmitted code, a plurality of facsimile recorders, switching means for connecting said circuit selectively to any one of said recorders in accordance with the indication of said code indicator and means operable by said switching means for controlling said scanning mechanism to scan said message area.

4. A facsimile switching system comprising a facsimile transmitter having elemental area scanning mechanism, means in said transmitter for supporting a facsimile transmitting blank having thereon a predetermined address area and a message area, a transmitting circuit for said transmitter, means for starting said scanning mechanism into operation to scan said address area repeatedly and to transmit address signals therefrom over said output circuit, an address signal indicator associated with said circuit for indicating the transmitted address signals, a plurality of facsimile recorders, a switching center at which said circuit terminates, switching means at said center for connecting said circuit selectively to any one of said recorders in accordance with the indication of said code indicator and means at said switching center for controlling said scanning mechanism to cause the scanning to progress from said address area past said message area.

5. A facsimile switching system comprising a facsimile transmitter having elemental area scanning mechanism, means in said transmitter for supporting a facsimile transmitting blank having thereon a predetermined address area, a message area and an end-of-message area, a transmitting circuit for said transmitter, means for starting said scanning mechanism into operation to scan said address area and to transmit signals therefrom over said output circuit, an address signal indicator associated with said circuit for indicating a transmitted address, a plurality of facsimile recorders, a switching center at which said circuit terminates, switching means at said center for connecting said circuit selectively to any one of said recorders in accordance with the indication of said indicator, means at said switching center for controlling said scanning mechanism to scan said message area and said end-of-message area to transmit facsimile signals therefrom and means controlled by signals transmitted from said end-of-message area for stopping said transmitter.

6. A facsimile switching system comprising a facsimile transmitter adapted to support a transmitting blank, said transmitter having a code transmitting zone, a message transmitting zone and an end-of-message transmitting zone, a transmitting circuit for said transmitter, means for starting said transmitter into operation to scan said coded zone and to transmit code signals therefrom indicative of the desired point of destination of said message, a switching center at which said circuit terminates, a code indicator at said switching center associated with said circuit for indicating the transmitted code, a plurality of facsimile recorders, switching means at said center for connecting said circuit selectively to any one of said recorders in accordance with the indication of said code indicator, means for starting the scanning operation of said connected recorder in phase with the transmitter and means responsive to signals transmitted from said end-of-message zone for stopping said recorder.

7. A facsimile switching system comprising a facsimile transmitter adapted to support a transmitting blank, said transmitter having a code transmitting zone and a message transmitting zone, a transmitting circuit for said transmitter, means for starting said transmitter into operation to scan said coded zone and to transmit code signals therefrom indicative of the desired point of destination of said message, a switching center at which said circuit terminates, a code indicator at said switching center associated with said circuit for indicating the transmitted code, a plurality of facsimile recorders, switching means at said center for connecting said circuit selectively to any one of said recorders in accordance with the indication of said code indicator and means for starting the scanning operation of said connected recorder in phase with the transmitter.

8. A facsimile switching system comprising a facsimile transmitter adapted to support a transmitting blank, said transmitter having scanning mechanism operable to scan the elemental area of said blank along two co-ordinates said transmitter having a code transmitting zone and a message transmitting zone, a transmitting circuit for said transmitter, means for starting said transmitter into operation to scan said coded zone along one co-ordinate only and to transmit code signals therefrom indicative of the desired point of destination of said message, a switching center at which said circuit terminates, a code indicator at said switching center associated with said circuit for indicating the transmitted code, a plurality of facsimile recorders, switching means at said center for connecting said circuit selectively to any one of said recorders in accordance with the indication of said code indicator and means for starting the scanning operation of said connected recorder and transmitter in phase along both co-ordinates.

9. A facsimile switching system comprising a facsimile transmitter adapted to support a transmitting blank, said transmitter having a code transmitting zone and a message transmitting zone, a transmitting circuit for said transmitter, means for starting said transmitter into operation to scan said coded zone and to transmit code signals therefrom indicative of the desired point of destination of said message, a switching center at which said circuit terminates, a code responsive device at said switching center associated with said circuit and selectively operable in accordance with the transmitted code signals, a plurality of facsimile recorders, switching means at said center for connecting said circuit selectively to any one of said recorders in accordance with the selective operation of said code responsive device and means for starting the scanning operation of said connected recorder in phase with the transmitter.

10. A facsimile switching system comprising a facsimile transmitter adapted to support a transmitting blank, said transmitter having a code transmitting zone, a message transmitting zone and an end-of-message transmitting zone, a transmitting circuit for said transmitting means, means for starting said transmitter into operation to scan said coded zone and to transmit code signals therefrom indicative of the desired point of destination of said message, a switching center at which said circuit terminates, a code responsive device at said switching center associated with said circuit and selectively operable in accordance with the transmitted code signals, a plurality of facsimile recorders, switching means at said center for connecting said circuit selectively to any one of said recorders in accordance with the selective operation of said code responsive device, means for starting the scanning operation of said connected recorder in phase with the transmitter and means responsive to signals transmitted from said end-of-message zone for stopping said recorder.

11. A facsimile switching system comprising a facsimile transmitter adapted to support a transmitting blank, said transmitter having a code transmitting zone and a message transmitting zone, a transmitting circuit for said transmitter, means for starting said transmitter into operation to scan said coded zone only and to transmit code signals therefrom indicative of the desired point of destination of said message, a switching center at which said circuit terminates, a code responsive device at said switching center associated with said circuit and selectively operable in accordance with the transmitted code signals, a plurality of facsimile recorders, switching means at said center for connecting said circuit selectively to any one of said recorders in accordance with the selective operation of said code responsive device, means at the transmitter for indicating the completion of said switching connection, means for starting the transmitter past said message transmitting zone and means for starting the scanning operation of said connected recorder in phase with the transmitter.

12. A facsimile switching system comprising a plurality of facsimile transmitters, each adapted to support a facsimile transmitting blank, each of said transmitters having a code transmitting zone and a message transmitting zone, a switching center, transmission circuits for each of said transmitters terminating at said switching center, a plurality of facsimile recorders, circuits for said recorders terminating at said switching center, a code indicator at said switching center common to said transmission circuits, means for selectively associating said code indicator with a desired transmission circuit, said indicator being responsive to the code signals transmitted from the code transmitting zone of the associated transmitter to indicate the code transmitted and switching means for selectively interconnecting said transmission circuit and said circuit for said recorders in accordance with the indicated code.

13. A facsimile switching system comprising a plurality of facsimile transmitters, each of which has means for transmitting code signals and facsimile message signals, a switching center, transmission circuits for each of said transmitters terminating at said switching center, a plurality of facsimile recorders, circuits for said recorders terminating at said switching center, a code indicator at said switching center common to said transmission circuits, means for selectively associating said code indicator with a desired transmission circuit, said indicator being responsive to the code signals transmitted from the associated transmitter to indicate the code transmitted and switching means for selectively interconnecting said transmission circuit and said circuit for said recorders in accordance with the indicated code.

14. A facsimile switching system comprising a plurality of facsimile transmitters, each of which has means for transmitting code address signals and facsimile signals, a switching center, transmission circuits for each of said transmitters terminating at said switching center, a plurality of facsimile recorders, circuits for said recorders terminating at said switching center, a code responsive device at said switching center common to said transmission circuits, means for selectively associating said code responsive device with a desired transmission circuit to selectively operate the same in accordance with the code address signals transmitted from the associated transmitter and switching means for selectively interconnecting said transmission circuit and said circuit for said recorders in accordance with the received code address signals.

15. A facsimile switching system comprising a plurality of facsimile transmitters, each of which has means for transmitting a continuous repetition of code signals and for transmitting facsimile message signals, a switching center, transmission circuits for each of said transmitters terminating at said switching center, a plurality of facsimile recorders, circuits for said recorders terminating at said switching center, a code responsive device at said switching center common to said transmission circuits, means for associating said code responsive device with a desired transmission circuit to selectively operate the same in accordance with the first complete series of code address signals transmitted from the associated transmitter after the connection of the code responsive device to the transmission circuit and switching means for selectively interconnecting said transmission circuit and said circuit for said recorders in accordance with the received code address signals.

16. In a facsimile switching system, means for transmitting code address and facsimile message signals comprising a message blank having a code address zone and a facsimile message zone, and a facsimile transmitter adapted to receive said blank and to scan the elemental areas of said address receiving zone and message recording zone in succession to transmit facsimile signals therefrom.

17. In a facsimile switching system, means for transmitting code address and facsimile message signals comprising a message blank having a code address zone and a facsimile message zone, and a facsimile transmitter adapted during one period of operation to scan said blank along one co-ordinate only to transmit a repetitive series of code address signals and in another period to scan said blank along both co-ordinates to transmit the facsimile message signals.

18. In a facsimile switching system, means for transmitting code address and facsimile message signals comprising a facsimile transmitter having a code signal transmission zone and a facsimile message transmission zone, means for controlling said transmitter during one period of operation for repeated scanning of said code signal transmission zone along a single co-ordinate and other means for controlling said transmitter during another period to scan said facsimile message zone along both co-ordinates.

19. In a facsimile switching system, means for transmitting code address and facsimile message signals comprising a facsimile transmitter having a transmitting cylinder provided with a code signal transmitting zone and a facsimile message transmitting zone, means for controlling said transmitter during one period of operation for repeated scanning of said code signal transmitting zone in a circular path and other means for controlling said transmitter during another period to scan said facsimile message zone along a spiral path.

20. In a facsimile system, the combination of a facsimile transmitter adapted to scan elemental areas of a message blank to transmit repeatedly a succession of facsimile signals comprising selecting code impulses, a code detector responsive to said impulses and comprising a distributor, means for periodically releasing said distributor for a single revolution in phase with said transmitted code impulses and visual indicating means selectively operable from said distributor to display said selecting code.

21. In a facsimile system, the combination of a facsimile transmission circuit, a facsimile transmitter adapted to scan elemental areas of a message blank to transmit repeatedly a succession of facsimile signals comprising selecting code impulses and phasing impulses over said circuit, a distributor normally disconnected from said circuit, means for associating said distributor with said circuit, means including said phasing impulses for operating said distributor in phase with said facsimile transmitter and selectively operable means associated with said distributor for operation in a coded manner in accordance with said selecting code impulses.

22. In a facsimile system, the combination of a facsimile transmission circuit, a facsimile transmitter adapted to scan elemental areas of a message blank to transmit repeatedly a succession of facsimile signals comprising selecting code impulses over said circuit, a distributor normally disconnected from said circuit, means for associating said distributor with said circuit, means for operating said distributor in phase with said facsimile transmitter and selectively operable means associated with said distributor for operation in accordance with said selecting code impulses.

23. In a facsimile system, the combination of a facsimile transmission circuit, a facsimile transmitter adapted to scan elemental areas of a message blank to transmit repeatedly a succession of facsimile signals comprising selecting code impulses over said circuit, a distributor associated with said circuit, means for operating said distributor in phase with said facsimile transmitter and selectively operable means associated with said distributor for operation in accordance with said selecting code impulses.

24. In a facsimile switching system, a plurality of facsimile transmitters adapted to transmit selecting code signals and facsimile message signals, a switching center, circuit connections from said transmitters extending to said switching center, switching means at said center for extending said circuit connections, means for operating said transmitters in a manner to transmit repeatedly a selecting code combination of selecting impulses and other means controlled from said switching center for operating said transmitters in a manner to transmit facsimile message signals.

25. In a facsimile switching system, a plurality of facsimile transmitters adapted to transmit selecting code signals and facsimile message signals, a switching center, circuit connections from said transmitters extending to said switching center, switching means at said center for extending said circuit connections, means for operating said transmitters in a manner to transmit repeatedly a code combination of selecting impulses and other means controlled by said switching means for operating said transmitters in a manner to transmit facsimile message signals.

26. In a facsimile switching system, a facsimile transmitter adapted to transmit facsimile message signals and selecting code signals indicative of the station of destination of said message signals, a switching center, a circuit extending from said transmitter to said switching center, call signal means at said switching center responsive to said selecting code signals irrespective of the selective nature thereof, indicating means at said switching center selectively responsive to said selecting code signals for indicating the station of destination of said message signals and switching means at said switching center for extending said circuit to said station of destination.

27. In a facsimile switching system, a facsimile transmitter adapted to transmit facsimile message signals and selecting code signals indicative of the station of destination of said message signals, a switching center, a circuit extending from said transmitter to said switching center, call signal means at said switching center associated with said circuit and responsive to said selecting code signals irrespective of the selective nature thereof, indicating means at said switching center normally disassociated with said circuit, means for associating said indicating means with said circuit, said indicating means being selectively responsive to said selecting code signals for indicating the station of destination of said message signals and switching means at said switching center for extending said circuit to said station of destination.

28. In a facsimile switching system, a plurality of facsimile transmitters, a switching office, a line connecting each of said transmitters with said office, means including each of said facsimile transmitters for transmitting facsimile signals to said switching office and means at said switching office for translating predetermined ones of said facsimile signals into switching code impulses.

29. In a facsimile switching system, a facsimile transmitter having elemental area scanning mechanism, a switching office, a transmission path connecting said transmitter with said office, a plurality of recording stations, a transmission path connecting each of said recording stations with said switching office, means including said facsimile scanning mechanism for transmitting a station identifying signals over said first transmission path to said switching office, means at said switching office selectively operative in accordance with said station identifying signals and switching means at said switching office for interconnecting said first transmission path with one of said recording stations over one of said second mentioned transmission paths in accordance with said station identifying signals.

30. In a facsimile switching system, a facsimile transmitter having elemental area scanning mechanism, a circuit terminating at said transmitter, a transmitting blank for said transmitter, said blank having a message bearing portion and a coded portion thereon for indicating the code designation of the station of destination of the message, means including said scanning mechanism for scanning said blank to generate facsimile signals corresponding to the coded and message portions thereof, means for transmitting said facsimile signals over said circuit and means associated with said circuit responsive to said signals generated from said coded portion of the blank to indicate the station of destination of said message.

RALEIGH J. WISE.
MARVIN J. REYNOLDS.

REFERENCES CITED

The following references are of record in the file of this patent:

UNITED STATES PATENTS

| Number | Name | Date |
|---|---|---|
| 2,193,967 | Kleinschmidt | Mar. 19, 1940 |
| 2,265,339 | Blanton et al. | Dec. 9, 1941 |
| 2,351,231 | Ridings | June 13, 1944 |
| 2,392,356 | Bacon | Jan. 8, 1946 |
| 2,396,286 | Ridings | Mar. 12, 1946 |
| 2,430,447 | Branson | Nov. 11, 1947 |